(12) United States Patent
Aratame et al.

(10) Patent No.: US 6,339,679 B1
(45) Date of Patent: Jan. 15, 2002

(54) SINGLE USE CAMERA WITH BUILT-IN ELECTRONIC FLASH

(75) Inventors: Kazuhisa Aratame; Kijiro Suzuki; Kei Kaneiwa; Takao Hosaka; Hiromi Nakanishi, all of Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/182,027

(22) Filed: Oct. 29, 1998

(30) Foreign Application Priority Data

| Nov. 4, 1997 | (JP) | ............................................. 9-301773 |
| Dec. 26, 1997 | (JP) | ............................................. 9-358898 |
| Feb. 24, 1998 | (JP) | ............................................. 10-041938 |
| Feb. 25, 1998 | (JP) | ............................................. 10-044065 |

(51) Int. Cl.$^7$ ........................... G03B 17/02; G03B 15/03
(52) U.S. Cl. ............................ 396/6; 396/176; 396/179
(58) Field of Search ........................... 396/6, 164, 176, 396/179

(56) References Cited

U.S. PATENT DOCUMENTS 3,906,525 A * 9/1975 Ettischer .................... 396/179
5,721,963 A * 2/1998 Iwagaki et al. ................ 396/6
5,752,084 A * 5/1998 Motomura et al. ............ 396/6
5,878,283 A * 3/1999 House et al. .................. 396/6

* cited by examiner

Primary Examiner—David M. Gray
(74) Attorney, Agent, or Firm—Jordan B. Bierman; Bierman, Muserlian and Lucas

(57) ABSTRACT

A single use camera with a built-in electronic flash includes a main body; a photographic film loaded in the main body previously; an electronic flash unit having an electronic flash light emitting section and an electronic flash circuit; and a photographing unit having a photographic lens and a shutter, wherein the following condition is satisfied, $$6 \leq A \leq 10$$

wherein A represents an exposure value, which is determined by an aperture value, a shutter speed and a sensitivity of a film loaded in the single use camera, when photographed in a condition in which the electronic flash unit is used.

20 Claims, 21 Drawing Sheets

SINGLE USE CAMERA WITH BUILT-IN ELECTRONIC FLASH

BACKGROUND OF THE INVENTION

The present invention relates to a single use camera with built-in electronic flash.

In the conventional single use camera with built-in electronic flash, in the stroboscopic photographing, there is a problem in which a main object in a distance of 2–3 m is a little overly exposed into a rather white image, and, on the other hand, its background is a little under-exposed into a rather dark image, resulting in unbalance as a total image.

Further, recently, in the single use camera, due to its increasing competition in the market, requirements for the unit are to design it to be more compact, and to manufacture it to be more inexpensive. Specifically, in the single use camera with built-in electronic flash, the influence of the electronic flash on the reduction of size or cost is extremely great.

As a type of electronic flash switch actuator, there is an automatic-return type which is turned ON when only operated by the operator, and which is returned to an OFF-state when the operator does not touch it, and which also opens a main switch in the electronic flash circuit, and a state holding type such as a slide type, seesaw type, or standing-up type, which holds the ON-state even when the operator stops touching it, and which maintains a main switch in the electronic flash circuit to be closed.

When the electronic flash switch actuator is the type of state holding type, there is an advantage that no charging operation is required for each continuous stroboscopic photographing, however, when the operator forgets to turn OFF the electronic flash switch actuator, and an ON state continues, the electronic flash charging operation is continued, resulting in useless consumption, and therefore, there is a possibility that stroboscopic photographing comes to be impossible before the entire exposures of a film roll are exposed.

For example, as an example of the single use camera with built-in electronic flash now in the market, an alkaline dry battery of 1.5 volts is used as its power source. When resistance of a step-up circuit of the electronic flash circuit is 220 Ω, the holding time of the dry battery voltage more than 1 v by which the electronic flash unit can be charged, is about 6 hours (refer to FIG. 14). Accordingly, when a night is over while the operator forgets turning OFF the electronic flash switch actuator, there is a case where, on the next day, the battery is exhausted up and no stroboscopic photographing can be done.

Further, in an electronic flash circuit of the conventional electronic flash unit, two switches are required one of which is a main switch to charge the electronic flash unit when it is used, and the other of which is a light emission stop switch to turn OFF a neon tube and to stop the light emission of the electronic flash unit even when the main capacitor is charged. Thereby, it results in cost-up, and further, there is a case where an electronic flash unit failure caused by these switches occurs.

Herein, the conventional electronic flash unit will be detailed below. The conventional electronic flash circuit is shown in FIG. 2.

In FIG. 2, BT is a battery consists of a SUM-3 type (or AA type) or SUM-4 type (or AAA type) dry battery, and when stroboscopic photographing is carried out, a main switch SW1 and a light emission stop switch SW2 are turned ON by operating an external operation member. Then, DC current is supplied from the battery BT to an oscillation transistor Q, oscillation transformer T1, and a resistor R1 through the main switch SW1, and an oscillation operation is carried out so that low DC voltage is converted into AC high voltage.

The AC high voltage outputted from the oscillation transformer T1 is rectified by a diode D, and charges the main capacitor C1. Further, a trigger capacitor C2 is charged through a resistor R2. When the voltage of the trigger capacitor C2 reaches a predetermined voltage value, the voltage is applied to a resistor R3 and a neon tube Ne, and the neon tube Ne starts discharging, that is, it is turned ON.

As described above, after the neon tube Ne is turned ON, when a release button, not shown, is pressed, a shutter blade is opened, and when the blade is fully opened, a trigger switch TSW is turned ON. When the trigger switch TSW is turned ON, electric charges, which are charged in the trigger capacitor C2, are discharged onto a primary winding T21 of a trigger coil T2, high voltage is generated in a secondary winding T22 and the voltage is applied to a trigger electrode G of a discharge tube Xe. As the result, ionized xenon atoms in the discharge tube Xe collide with electrons sprung out from a cathode and are excited, and thereby, the discharge tube Xe is lit.

Further, while the main capacitor C1 is charged and the neon tube Ne is lit, when the main switch SW1 is turned OFF by operating the external operation member, the oscillating operation is stopped. Further, the light emission stop switch SW2 is also simultaneously turned OFF, thereby, the neon tube Ne is turned OFF, and even when the release button is further pressed and the trigger switch TSW is turned ON, the trigger capacitor C2 does not discharge, thereby, the discharge tube Xe does not emit light.

Next, as an alternative means for cost reduction, it is also considered that, as an indicator lamp, an expensive neon tube is not used, but an inexpensive light emitting diode is used, and the description relating to this is disclosed in Japanese Patent Publication Open to Public Inspection No. 115796/1996. However, when the neon tube is not used but the light emitting diode is used, there is a problem that the trigger voltage outputted from the trigger transformer becomes too high. Further, when the light emitting diode is used as the indicator lamp, an amount of light emission or lighting timing can be adjusted using characteristics of the light emitting diode, however, in the structure stated above, in which the tertiary winding of the oscillating transformer is used also for a lighting circuit of the light emitting diode, there are disadvantages that the number of windings of the tertiary winding is set for the control of the oscillating transistor, therefore, when the number of windings of the tertiary winding is increased or decreased for, for example, the light amount adjustment of the light emitting diode, the discharging voltage is lowered, thereby, the charging characteristics are also changed like that, for example, a long period of time is necessary for charging.

In this connection, a detail of the conventional electronic flash circuit in which the light emitting diode is used as the indicator lamp, is shown in FIG. 25. An electronic flash circuit 301 is largely divided into a step-up circuit 302 to step up the power source such as a dry battery BT, and a flash light emitting circuit 303 to make the electronic flash light emitting tube Xe emit light. In the step-up circuit 302, an oscillating transformer TR1 and oscillating transistor Q, and further, a light emitting diode LED as an indicator lamp are provided, and in the flash light emitting circuit 303, an electronic flash light emitting tube Xe, a main capacitor MC, and a trigger switch TSW are provided.

The oscillating transformer TR1 in the step-up circuit 302 has a primary winding W1, a secondary winding W2, and a tertiary winding W3 as a feed back winding. The AC high voltage is generated in the secondary winding corresponding to a turns ratio of primary winding to secondary winding, and the tertiary winding W3 controls to stabilize the base potential voltage of the oscillating transistor Q, and the light emitting diode LED is connected to both ends of the tertiary winding W3 of the oscillating transformer TR1, and thus, a light emitting diode lighting circuit 304 (hereinafter, referred to as LED lighting circuit) is structured.

The high voltage generated by the oscillating transformer TR1 by turning ON the main switch MSW, charges the main capacitor MC in the flash light emitting circuit 303, lighting of the light emitting diode LED indicates the completion of charging of the main capacitor MC, and when the trigger switch TSW is turned ON being interlocked with the shutter blade, the electronic flash light emitting tube Xe emits light, so that the stroboscopic photographing is carried out.

SUMMARY OF THE INVENTION

In view of the foregoing problems, a first object of the present invention is to provide a single use camera with built-in electronic flash which finely exposes both of the main object and the background, in both cases of stroboscopic photographing and normal photographing using the single use camera with built-in electronic flash.

The other object of the present invention is to provide a single use camera with built-in electronic flash which can further reduce the size and cost of the single use camera.

In order to attain the other object of the present invention, the present inventor noticed that it is important to pay attention to a capacitor and a battery. In detail, the present inventor noticed the following: in the single use camera with built-in electronic flash, a main capacitor to be charged with the DC high voltage energy which is applied to a discharge tube to emit the flash light, and a battery as a power source of the electronic flash unit, specifically require a large space, and therefore, when capacity of the main capacitor is more reduced, capacity of the battery may also be the more reduced. Further, when the capacity of the main capacitor and that of the battery are more reduced, the cost is the more reduced.

Still another object of the present invention is to provide a single use camera with built-in electronic flash in which the life of the battery is prolonged by reducing current consumption to the utmost in the electronic flash circuit, thereby, the stroboscopic photographing can be carried out for a long period of time.

Yet another object of the present invention is to provide a single use camera with built-in electronic flash, provided with a flash circuit having the same function as that in the case where 2 switches are provided, while only one switch which is used for both of the main switch and the light emission stop switch, is provided.

Further object of the present invention is to provide a single use camera with built-in electronic flash in which the trigger voltage is adequate even when a light emitting diode is used.

Yet further object of the present invention is to provide a single use camera with built-in electronic flash in which an LED lighting circuit is independently provided electrically so that the lighting function of the light emitting diode does not interfere with the charging function for the flash light emission.

The above objects are attained by any of the following structures (1) to (6).

(1) A single use camera with built-in electronic flash characterized in that a roll film having the sensitivity not less than ISO 640 is previously loaded therein and the capacity of a main capacitor of a flash unit is not less than 15 $\mu$F and not more than 80 $\mu$F.

(2) A single use camera with built-in electronic flash includes a main body; a photographic film loaded previously in the main body; an electronic flash unit having an electronic flash light emitting section and an electronic flash circuit; and a photographic unit having a photographic lens and shutter, and the single use camera further satisfies the following conditional relationship:

$$6 \leq A \leq 10, \text{ and } A+1 \leq B \leq A+4,$$

where A: an exposure value converted into the film sensitivity of ISO 100 which is determined by an aperture value and shutter speed in the state of stroboscopic photographing, and the sensitivity of loaded film; and
B: an exposure value converted into the film sensitivity of ISO 100 which is determined by an aperture value and shutter speed in the state of normal photographing, and the sensitivity of loaded film.

(3) A single use camera with built-in electronic flash having a flash circuit comprising: an oscillating transformer to step up the source voltage to high voltage; a main capacitor which is connected to the oscillating transformer and to which the stepped up high voltage is applied; a trigger capacitor connected to one end of the main capacitor through a resistor; and a trigger coil to apply the high voltage onto a xenon tube by circulating electric charges accumulated in the trigger capacitor, the single use camera with built-in electronic flash characterized in that a flash circuit is provided, in which one end of a main switch, which is manually opened/closed, is connected to a portion between a secondary winding and a tertiary winding of the oscillating transformer, and is connected to one end of the trigger capacitor; and the other end of the main switch is connected to a base of the oscillating transistor to oscillate the oscillating transformer; and an emitter of the oscillating transistor is electrically grounded.

(4) A single use camera with built-in electronic flash having a flash circuit comprising: an oscillating transformer to step up the source voltage to high voltage; a main capacitor which is connected to the oscillating transformer and to which the stepped up high voltage is applied; a trigger capacitor connected to one end of the main capacitor through a resistor; and a trigger coil to apply the high voltage onto a xenon tube by circulating electric charges accumulated in the trigger capacitor, the single use camera with built-in electronic flash characterized in that a base of the oscillating transistor to oscillate the oscillating transformer is connected to a portion between the secondary winding and the tertiary winding of the oscillating transformer, and one end of the trigger capacitor; one end of the main switch which is manually opened/closed, is connected to the emitter of the oscillating transistor; and the other end of the main switch is electrically grounded.

(5) A single use camera in which a camera main body previously accommodating an unexposed roll film therein, is integrally provided with a flash unit; an oscillating transformer having a primary winding, a secondary winding and a tertiary winding, and a resistor to control a current in the step-up circuit are provided in a step-up circuit of a flash circuit; and a state holding type actuator is used for a flash switch actuator to operate a main switch in the flash circuit, the single use camera characterized in that the resistor in the step-up circuit is set to a value of 1 KΩ to 200 KΩ.

(6) A single use camera in which a camera main body previously accommodating an unexposed roll of film therein, is integrally provided with a flash unit; and an oscillating transformer having a primary winding to n-th order winding for flash light emission, and a light emitting diode as an indicator lamp, are provided in a step-up circuit of a flash circuit, the single use camera characterized in that a winding for the light emitting diode is provided in the oscillating transformer separately from the primary winding to n-th order winding for the flash light emission, and the light emitting diode is connected to both ends of the winding for the light emitting diode, thereby, the light emitting diode lighting circuit is structured.

DETAILED DESCRIPTION OF THE PREFERRED EMBODIMENT

Referring to FIGS. 1 through 4 examples of Structures (1) and (2) of a single use camera with built-in electronic flash in the present invention will be detailed below.

Figure 1:
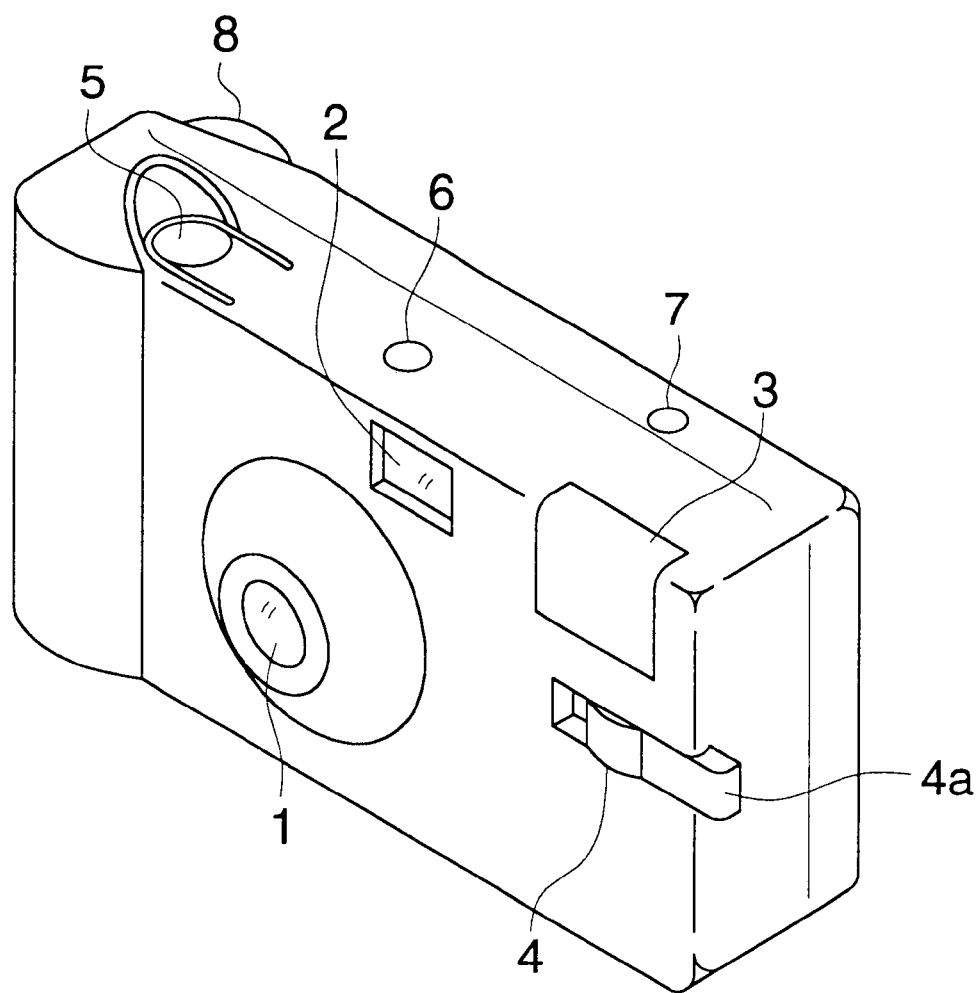
FIG. 1 is an external perspective view of a single use camera with built-in electronic flash.

FIG. 1 is an external perspective view of a single use camera with built-in electronic flash. On the front surface, a picture taking lens 1, a viewfinder window 2, a flash light emitting section 3, and a flash switch lever 4 are arranged, and on the upper surface, a release button 5, a frame number indicator window 6, and a charging display window 7 are arranged, and on the back surface, a winding knob 8 is arranged. Herein, when stroboscopic photographing is conducted, a main switch provided inside the unit is turned on by sliding the flash switch lever 4 in the right direction in the drawing, and charging of the flash starts. When a main capacitor provided inside the unit is charged to a predetermined voltage value, the charging display window 7 is lit, and thereby, the charging state can be visually confirmed. The release button 5 may be pressed for photographing. In this connection, when the flash switch lever 4 is slid in the right direction as shown in the drawing, an end portion 4a is protruded in the right direction, and thereby, it is easily judged that the main switch is turned on.

Figure 2:
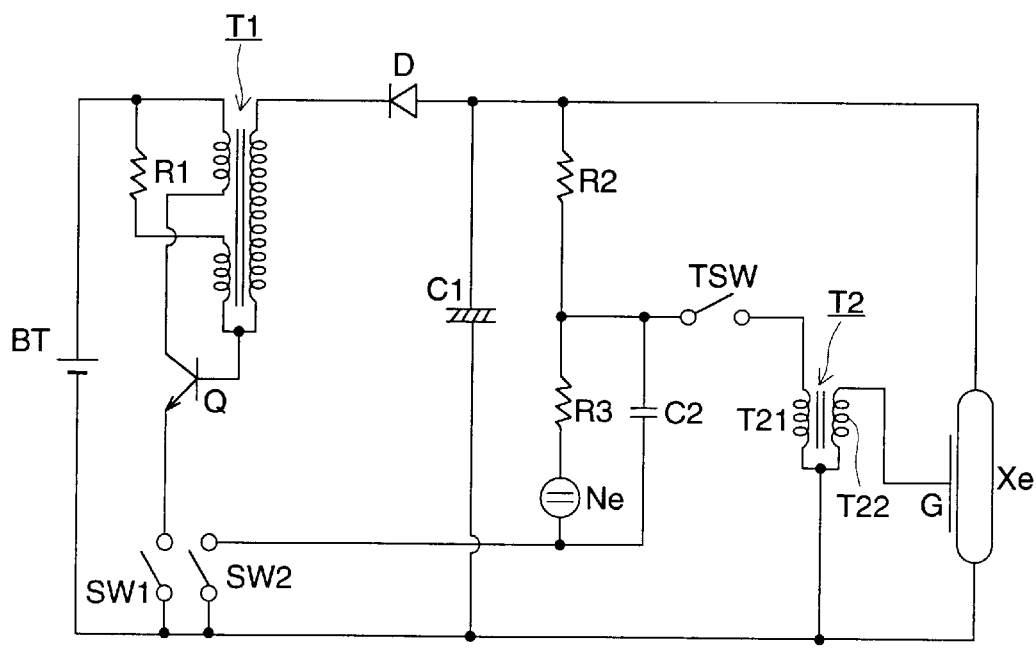
FIG. 2 is the conventional flash circuit diagram.

The main capacitor in the flash circuit shown in FIG. 2 in the single use camera with built-in electronic flash as shown in FIG. 1 is normally set to about 120 $\mu$F in many cases, and a guide number of the flash light is about 10. Further, in the single use camera, a roll of film is previously loaded in the production process, and the film sensitivity is normally ISO 400. Further, in many cases, a fully opened F-number of a picture taking lens is set to about F11, and a shutter speed is set to about 1/100. For a battery as a power source, one AA type battery is commonly used.

In such the single use camera with built-in electronic flash, as far as the 120 $\mu$F main capacitor and the AA type battery are used, it is difficult to attain size reduction in a great degree. Accordingly, the capacity of the main capacitor is reduced, and a high sensitivity roll film is loaded in the unit so that the stroboscopic photographing performance is not influenced even when the guide number is lowered due to the capacity reduction of the main capacitor. In this connection, there also be many cases in which the stroboscopic photographing is not conducted like the photographing in the day, therefore, in order to prevent excessive exposure in the photographing during open daylight due to the high sensitive film, it is necessary that the shutter speed is made to be higher in proportion to an increase of the sensitivity of the film.

The preferable relationship among the film sensitivity (ISO), capacity of the main capacitor, the shutter speed and the guide number of the electronic flash when the open F-number of the picture taking lens is F11 will be shown in Table 1.

TABLE 1

| ISO | Capacity of capacitor | Shutter speed | Guide number |
| --- | --- | --- | --- |
| 400 | 120 µF | 1/100 | 10 |
| 640 | 80 µF | 1/160 | 8 |
| 800 | 60 µF | 1/200 | 7 |
| 1600 | 36 µF | 1/400 | 5 |
| 3200 | 15 µF | 1/800 | 3.5 |

As shown in Table 1, when the film having the sensitivity of ISO 640 or more is used, the capacity of the main capacitor can be not more than 80 µF. Further, when the film sensitivity to be used is not less than ISO 3200, the capacity of the main capacitor can be less than 15 µF.

Further, when the capacity of the main capacitor may be small by using the high sensitivity film, the charging time is shortened the possibility to miss the shutter chance is reduced. The capacity of the battery as the power source may be smaller, the AA type battery can be more compact, and replaced with an AAA type or N type battery, and when conventionally the same type alkaline battery is used, an inexpensive manganese battery can be used.

The capacity of the capacitor is approximately proportional to a capacitor volume, therefore, when the capacity of the capacitor is reduced to ½ or ¼, it greatly to size reduction, and further when the N type battery is used, the volume is 1/2.4 times as compared to that of the AA type battery, thereby, further size reduction can be attained.

For example, in the case where the capacity of the main capacitor is 120 µF, if not only the AA type battery but also the AAA type battery can be used, when the capacity of the main capacitor is 60 µF, and an N type battery is used, the performance is higher than that in the case where the capacity of the main capacitor is 120 µF, and the AAA type battery is used. Accordingly, by reducing the capacity of the main capacitor, the N type battery, which is not considered conventionally to be used for the flash, comes to be usable.

Further, also in the use of the high sensitivity film, the capacity of the main capacitor, the shutter speed and the guide number of the electronic flash come to be different depending on the open F-number. This preferable relationship in the cases of ISO 800 and ISO 1600 will be shown in Table 2.

TABLE 2

| ISO | Open F-number | Capacity of capacitor | Shutter speed | Guide number |
| --- | --- | --- | --- | --- |
| 800 | 16 | 120 µF | 1/100 | 10 |
| | 11 | 60 µF | 1/200 | 7 |
| | 8 | 30 µF | 1/400 | 5 |
| | 5.6 | 15 µF | 1/800 | 3.5 |
| 1600 | 16 | 60 µF | 1/200 | 7 |
| | 11 | 30 µF | 1/400 | 5 |
| | 8 | 15 µF | 1/800 | 3.5 |

As is recognized from Table 2, it is preferable to make (open F-number) of the photographic lens to be not less than F5.6 and not more than F16. It is more the aperture value to be not less than F5.6 F11.

The F-number or the shutter speed is not changed during photographing, the preferable range of the V) is not less than 10 and not more than 12, and the preferable range of the guide number of the electronic flash is not less than 2 and not more than 9.

In the above description, the presupposition is that the F-number and the shutter speed are not changed. However, when a diaphragm member having an aperture whose diameter is smaller than that of the open F-number is placed on the optical axis of the picture taking lens so that it can be inserted in and removed from, and the diaphragm member is withdrawn and photographing is conducted at an open F-number during the stroboscopic photographing, and the diaphragm member is inserted and photographing is conducted at a small F-number in the photographing during open daylight, or when the shutter speed is changed simultaneously when the F-number is changed, or when only the shutter speed is changed, then, the accuracy of the exposure can be more improved.

It is preferable that the change of the F-number or shutter speed is synchronized with the change of ON-OFF of the switch in the electronic flash. The mechanism set forth in Japanese Tokkaihei No. 8-184944 may be used as the concrete mechanism for the change of the F-number or the shutter speed.

For example, when the sensitivity of film to be loaded is ISO 800 the capacity of the main capacitor in the flash circuit is 30 µF, the F-number in the stroboscopic photographing state (the first photographing state) is F6.7, the shutter speed is 1/60 sec., and the F-number in the normal photographing state (the second photographing state) is F11, and the shutter speed is 1/160 sec., then, a print in which the main object at the distance of 2 to 3 m, and the background in the room are finely exposed, can be obtained, while it is difficult to obtain such the print by the conventional single use camera with built-in electronic flash in the stroboscopic photographing under the room illumination during the night. This is for the reason that the capacity of the main capacitor in the flash unit is smaller than that of the conventional one, and the intensity of the flash light is smaller than that of the conventional one, therefore, the difference of the brightness between the main object illuminated by the flash light, and the inside of the room illuminated by the room illumination, becomes small. Incidentally, when the outdoor photographing during daylight is conducted in the ordinary photographing state, the same fine print as that in the conventional photographing can be obtained.

As described above, in the case where a single use camera with built-in electronic flash is structured such that the stroboscopic photographing state and the ordinary photographing state can be switched to each other, when the EV value which is converted into the film sensitivity of ISO 100 determined by the F-number, shutter speed, and the sensitivity of the loaded film, in the stroboscopic photographing state, is expressed by A; the EV value which is converted into the film sensitivity of ISO 100 determined by the F-number, shutter speed, and the sensitivity of the loaded film, in the ordinary photographing state, is expressed by B, the film unit is preferably structured such that A and B respectively satisfy the following conditional relationships:

$6 \leq A \leq 10$ $A+1 \leq B \leq A+4.$

The EV value can be obtained by the following equation.

$EV = [Log_{10}F^2 + Log_{10}(1/T) - Log_{10}(S/100)]/Log_{10}2$

Where F is the F-number, T is the shutter speed (sec), and S is ISO sensitivity of the film.

The F-number F, shutter speed T (sec), ISO sensitivity S of the film are respectively set from the range of $F \geq 5.6$, T≦1/50, and S≧640. Incidentally, it is preferable to make F to be not more than F16.

Incidentally, the capacity of the main capacitor of the flash unit is set from the range of not less than 15 μF and not more than 80 μF, corresponding to ISO sensitivity of the film to be loaded, and the F-number in the stroboscopic photographing state.

Further, it becomes possible to use an AAA type or N type of dry battery as a battery for use in the electronic flash, by reducing the capacity of the main capacitor.

In the conditional relationship of A in the stroboscopic photographing state, when A is lower than the lower limit, it is difficult that the shutter speed is set to higher than 1/50 sec, at which camerashake hardly occurs, and the picture taking lens is structured by plastic lenses not more than two pieces, and the number of parts to structure the single use camera is increased and its production becomes difficult. Further, when A exceeds the upper limit, it is difficult to obtain a print, in which the main object in the distance of 2 to 3 m and the background in the room are finely exposed, in the photographing under illumination during the night in the stroboscopic photographing state.

Further, in the conditional relationship of B in the ordinary photographing state, when B is lower than the lower limit, in the case where A in the stroboscopic photographing state is set to lower than EV 8, B becomes lower than EV 9, and in the outdoor photographing in the fine day, exposure is too excessive. When B exceeds the upper limit, in the case where A in the stroboscopic photographing state is set to near the upper limit, B becomes larger than 14, and in the outdoor photographing in the cloudy day, exposure is too insufficient.

It is more preferable that A in the stroboscopic photographing state and B in the ordinary photographing state respectively satisfy the following conditional relationships:

$7 \leq A \leq 10$ $A+1 \leq B \leq A+3$.

It is more preferable that the following expressions are satisfied:

$7 \leq A \leq 9.5$ $A+1 \leq B \leq A+3$.

It is still more preferable that the following expressions are satisfied:

$7 \leq A \leq 9$ $A+1 \leq B \leq A+3$

When the change of the F-number or the shutter speed during the stroboscopic photographing is carried out, it is preferable during the stroboscopic photographing that the expression of $6 \leq F \leq 9$ is satisfied, it is more preferable that the expression of $6 \leq F \leq 9$ is satisfied, and it is still more preferable that the expression of $6 \leq F \leq 8.6$ is satisfied. It is preferable that the guide number of the electronic flash is not less than 2 and not more than 9. On the other hand, when photographed without operation of the electronic flash, it is preferable that the expression of $9 \leq F \leq 14$ is satisfied.

Incidentally, the main switch of the flash unit described in FIGS. 1 and 2 is the type in which the flash switch lever is slid, and when it is forgotten to return the flash switch lever after photographing, in the case where a small capacity battery such as an N type battery is used, the battery is rapidly exhausted, and then, there is a possibility that the stroboscopic photographing can not be conducted. Accordingly, when the small capacity battery is used, it is preferable to use a flash circuit in which one touch type main switch is used, and when the main switch is turned on once, the oscillation is maintained, and when the voltage reaches a predetermined value, the oscillation is automatically stopped.

Figure 3:
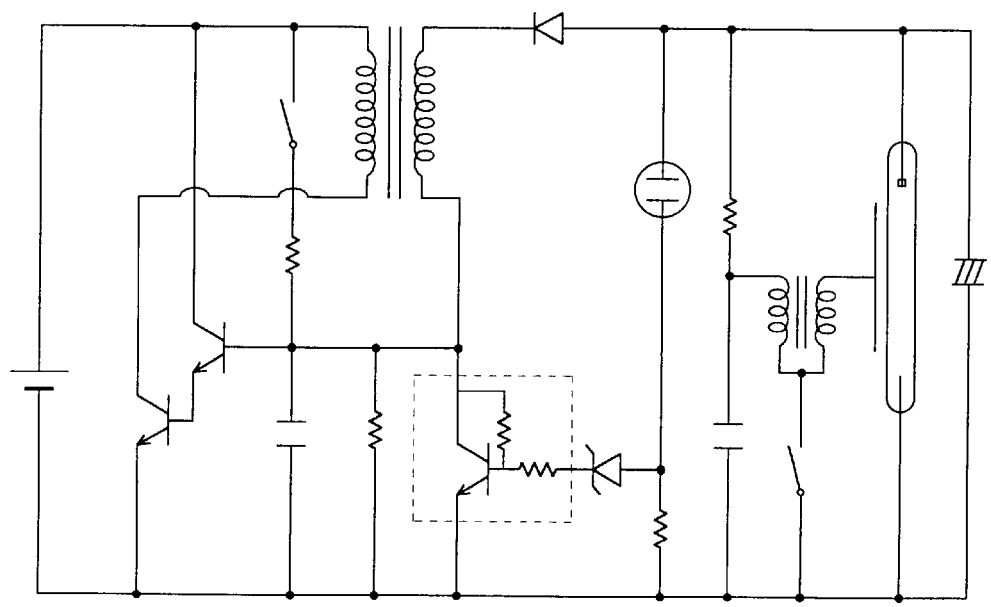
FIG. 3 is a flash circuit diagram of Structures (1) and (2).

Although detailed description is omitted, such the energy saving type flash circuit diagram will be shown in FIG. 3.

Next, referring to a flash circuit diagram in FIG. 4, as a display of the flash charging, an example in which an expansive neon tube is not used, but an inexpensive light emitting diode is used, will be described.

Figure 4:
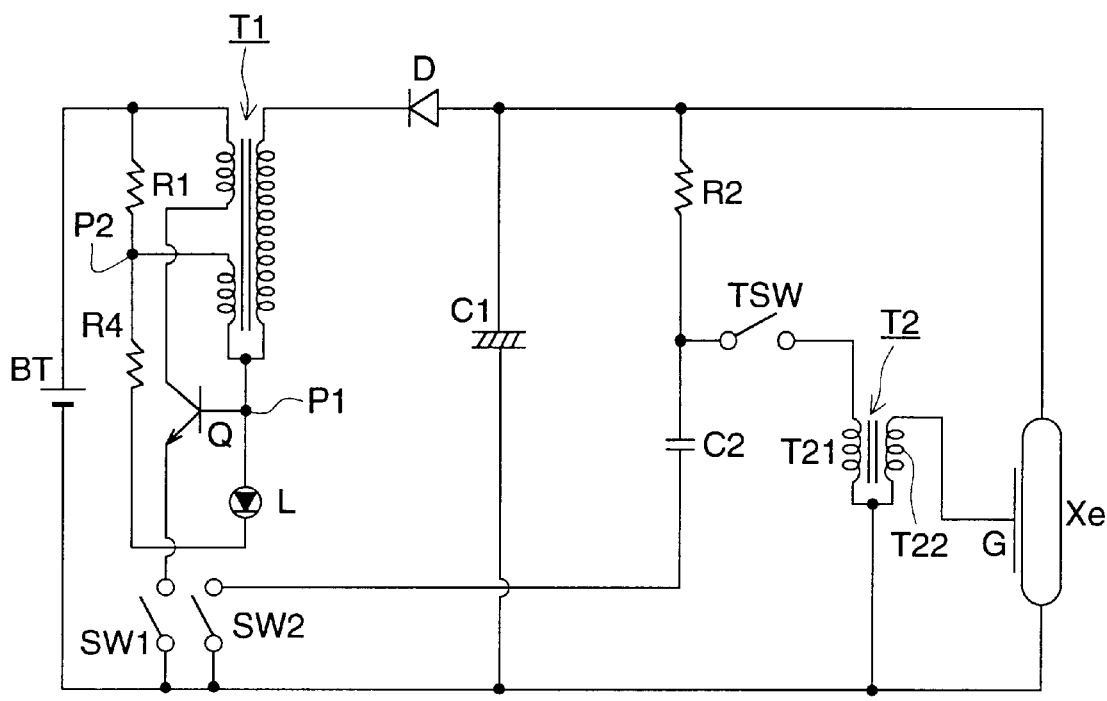
FIG. 4 is the flash circuit diagram of Structures (1) and (2).

The flash circuit diagram shown in FIG. 4 is similar to the flash circuit diagram shown in FIG. 2, and therefore, description of the same portion as in FIG. 2 will be omitted.

Different points are as follows: a light emitting diode L and a resistor R4 are serially arranged between a connecting point P2 connected to the resistor R1 and the tertiary winding of the oscillating transformer T1, and a connecting point PI connected to the base of the transistor Q and a common point of the secondary winding and the tertiary winding of the oscillating transformer T1, and the resistor R3 and the neon tube Ne are abolished.

When the main switch SW1 is turned ON, an oscillation operation is carried out so that low DC voltage is converted into AC high voltage. The high voltage AC current outputted from the oscillation transformer T1 is rectified by a diode D, and charges the main capacitor C1. At the start of charging, the potential voltage of the connecting point P2 is a slight higher than that of the connecting point P1, therefore, the light emitting diode L does not emit light. However, as the charging voltage of the main capacitor C1 is higher, the potential voltage of the connecting point P2 is gradually lowered, and when the charging voltage reaches about 280 V, which is the necessary minimum voltage for the stroboscopic photographing, the light emitting diode L emits light dimly at about 1.7 V, due to the rising voltage outside a period of the counter electromotive force of the oscillating transformer T1, and when the charging voltage is further increased, the light emitting diode L emits light brightly at about 2.3 V, and thereby, completion of charging can be visually confirmed.

However, as in the flash circuit diagram as shown in FIG. 2, when the neon tube Ne is used, the voltage applied onto the primary winding T21 of the trigger transformer T2 is stable due to the constant voltage characteristic of the neon tube, however, in this flash circuit diagram, the voltage applied onto the primary winding T21 of the trigger transformer T2 is increased as an increase of the charging voltage of the main capacitor C1, therefore, when entirely the same trigger transformer T2 as that in the flash circuit diagram shown in FIG. 2 is used, the voltage of the secondary winding T22 that is, the trigger voltage becomes too high.

Therefore, it is necessary that a turns ratio of the trigger transformer T2 is lowered to suppress the increase of trigger voltage. In this connection, the conventional turns ratio is 40 to 50, however, it is preferable that the turns ratio is 20 to 35 in the present invention.

Incidentally, when the light emitting diode is illuminated by the outdoor daylight, its lighting state is difficult to be visually confirmed, therefore, it is preferable that a transparent external packing case is used so that the lighting chip can be directly confirmed visually.

Alternatively, the flash circuit may be structured so that the light emitting diode L flickers.

According to the single use camera with built-in electronic flash of the present invention, the size reduction and cost reduction can be attained by reducing the capacity of main capacitor or the battery capacity.

Further, according to the single use camera with built-in electronic flash of the present invention, a print can be obtained in which both of the main object and the background in the room are finely exposed.

Still further, according to the single use camera with built-in electronic flash of the present invention, even when the light emitting diode is used for the charging display of the flash, the trigger voltage of the trigger transformer is not excessively increased.

Yet further, according to the single use camera with built-in electronic flash of the present invention, lighting of the light emitting diode can be easily confirmed visually without influence of the outdoor daylight.

Next, referring to FIG. 5, a flash circuit of examples of the Structures (3) and (4) of the present invention will be described.

Figure 5:
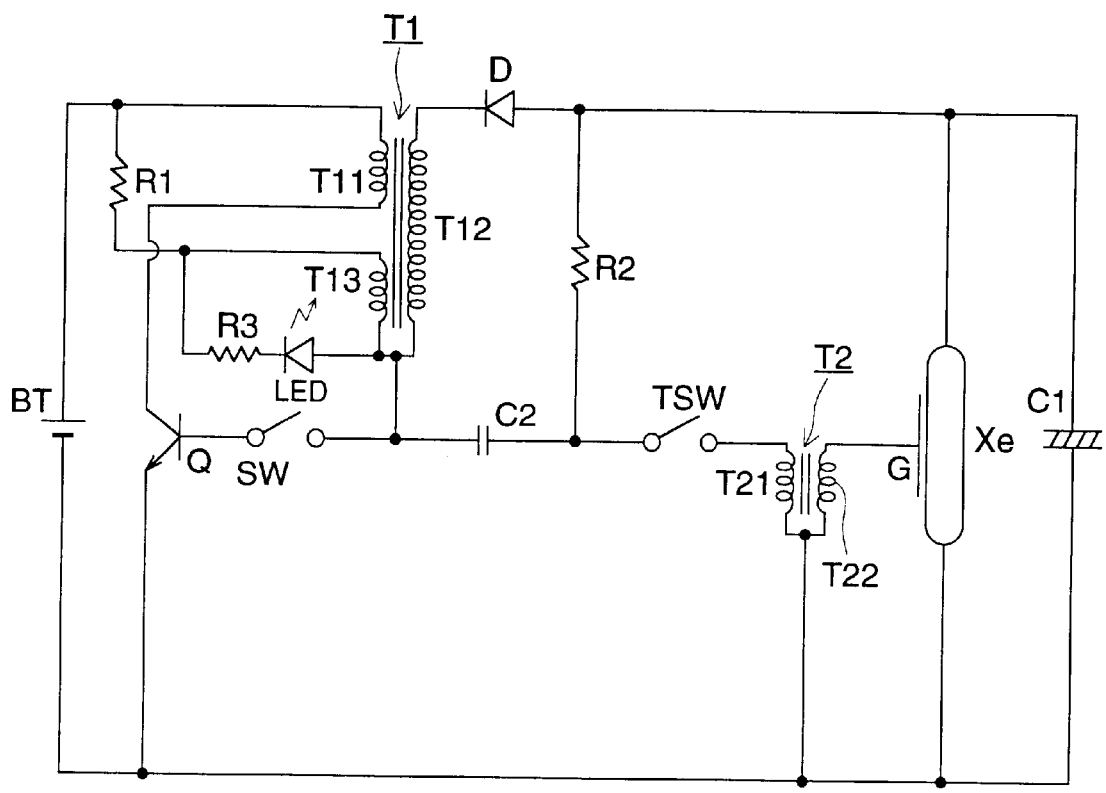
FIG. 5 is a flash circuit diagram of Structures (3) and (4) of the present invention.

In FIG. 5, parts having the same function as that in FIG. 2 of the conventional technology are denoted by the same numbers. The points which are largely different from FIG. 2, are a point in which the neon tube Ne is replaced with the light emitting diode LED, and a point relating to the arrangement of the main switch.

When the main switch is turned ON, the base current is supplied to the oscillating transistor Q through the tertiary winding T13 of the oscillating transformer T1, and the oscillating transistor is turned ON, and the current flows to the primary winding T11 of the oscillating transformer T1. The current due to high voltage corresponding to the turns ratio flows to the secondary winding T12 of the oscillating transformer T1, and the main capacitor C1 and the trigger capacitor C2 is charged by the current rectified by the diode D. Simultaneously, AC voltage is generated on both ends of the tertiary winding T13 corresponding to the turns ratio, and the voltage is increased corresponding to the charging voltage of the main capacitor C1.

When the voltage of the main capacitor C1 reaches a predetermined value, the voltage on both ends of the tertiary winding T13 is increased to the voltage (1.6 to 2.0 V) which is necessary for starting the lighting of the light emitting diode LED connected in parallel with the tertiary winding T13, and when the light emitting diode LED is lit, it is indicated that flash light emitting can be conducted. Lighting timing and brightness of the light emitting diode LED may be appropriately selected corresponding to the number of winding of the tertiary winding T13 of the oscillating transformer T1, and the resistance value of the resistor R3 serially connected to the light emitting diode LED.

Thus, when the trigger switch TS1 is turned ON after the light emitting diode LED has been lit, a trigger current path is formed by the oscillating transistor Q, main switch SW, trigger capacitor C2, trigger switch TSW, and the primary winding T21 of the trigger transformer T2, and therefore, electric charges charged in the trigger capacitor C2 is discharged to the primary winding T21 of the trigger transformer T2, and high voltage is generated in the secondary winding T22, and the voltage is applied to the trigger electrode G of the discharge tube Xe, and then, the discharge tube Xe emits light.

Further, in the case where the main capacitor C1 is charged and the light emitting diode is lit, when the main switch is turned OFF, the base current of the oscillating transistor Q is interrupted, therefore, the oscillating transistor Q is turned OFF, the oscillating operation is stopped, and the light emitting diode LED is turned OFF. Even when the release button is further pressed and the trigger switch TSW is tuned ON, the trigger current path is interrupted by the main switch SW, and trigger capacitor C2 does not discharge, therefore, the discharge tube Xe does not emit light.

Next, referring to FIG. 6, another flash circuit will be described.

Figure 6:
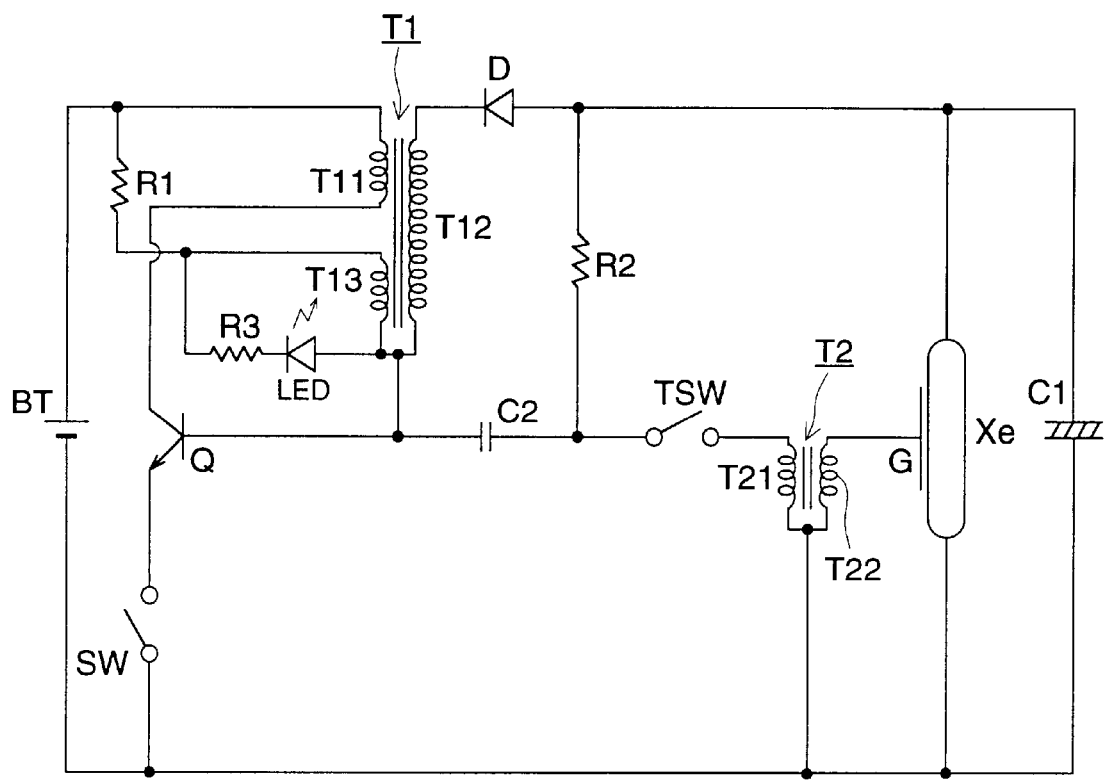
FIG. 6 is the flash circuit diagram of Structures (3) and (4).

Although the circuit diagram in FIG. 6 is similar to that in FIG. 5, only different point is that one end of the main switch SW is connected to emitter of the oscillating transistor Q and the other end is electrically grounded. Even when the arrangement of the main switch SW is changed as described above, the same circuit operation as in FIG. 5 is conducted.

However, in the case where the main switch SW is arranged as shown in FIG. 5, the current flowing through the main switch SW is about 1/1000 as compared to the case of the arrangement as shown in FIG. 6, and therefore, the arrangement in FIG. 5 is more preferable.

According to the flash circuit of the single use camera with built-in electronic flash of the present invention, both operations of the conventional main switch and light emission stop switch can be conducted by only one main switch, thereby, cost is reduced, and further, the quality and reliability of the flash are improved.

Further, according to the flash circuit of the single use camera with built-in electronic flash of the present invention, the light emitting diode is used instead of the neon tube, thereby, cost is greatly reduced.

Figure 7:
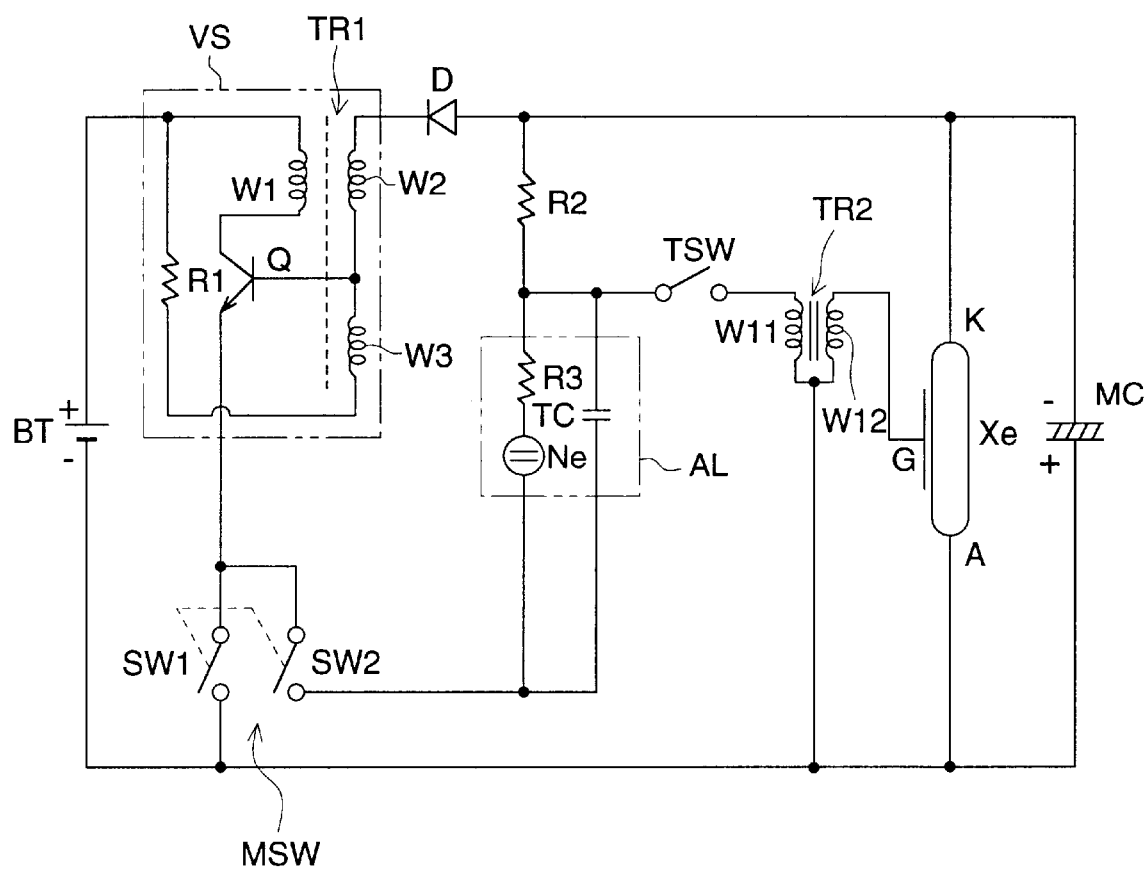
FIG. 7 is a flash circuit diagram for use in a single use camera, and shows a first example of Structure (5) of the present invention.
Figure 8:
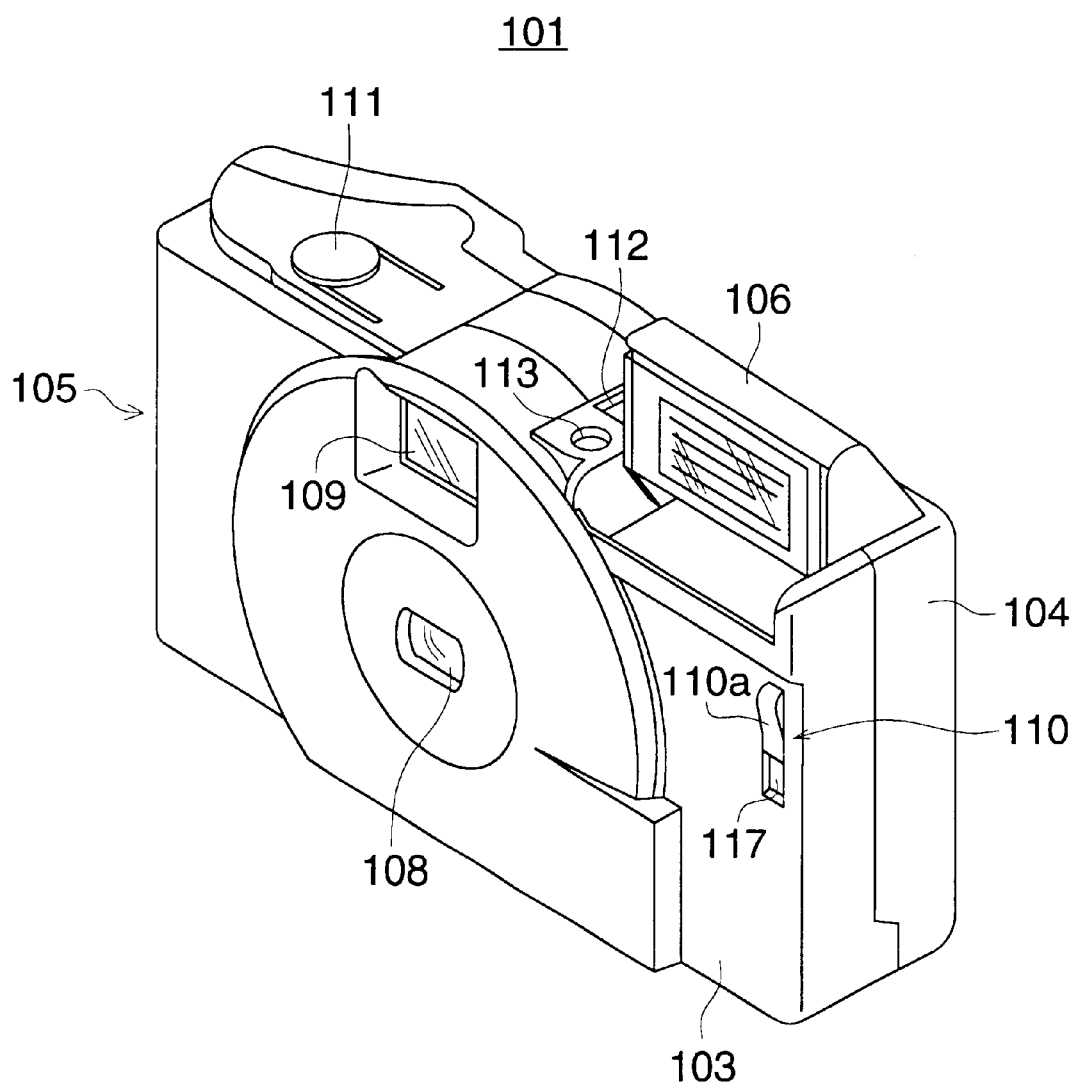
FIG. 8 is a perspective view of the single use camera viewed from the direction of the front, and shows the first example of Structure (5).
Figure 9:
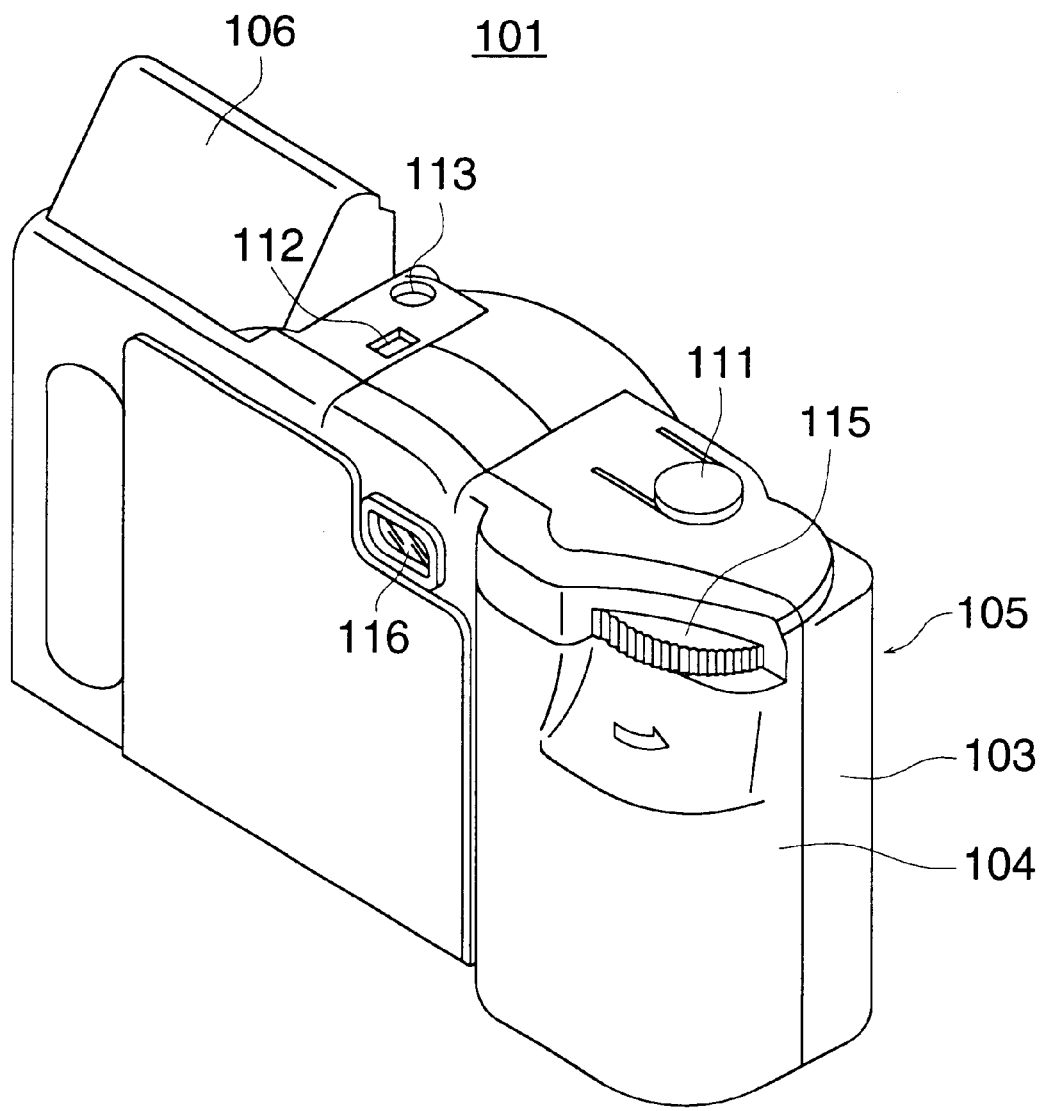
FIG. 9 is a perspective view of the single use camera viewed from the direction of the back, and shows the first example of Structure (5).
Figure 10:
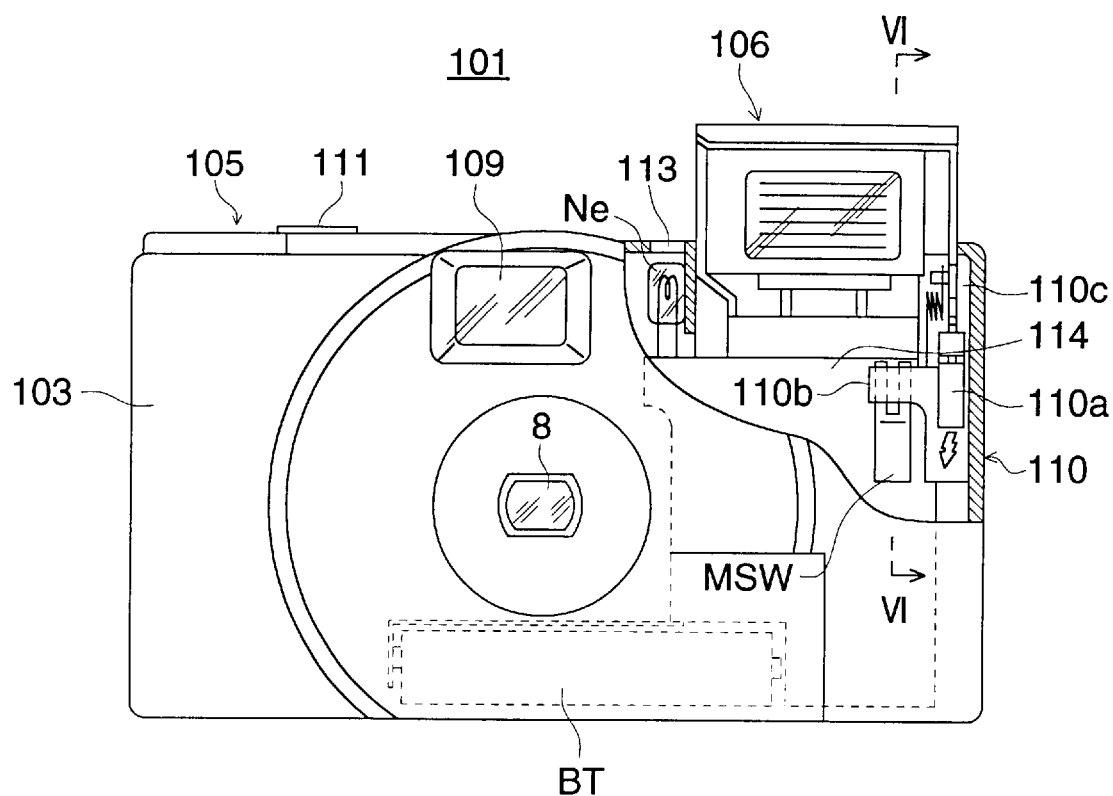
FIG. 10 is a partially cutout front view of the single use camera, and shows the first example of Structure (5).
Figure 11:
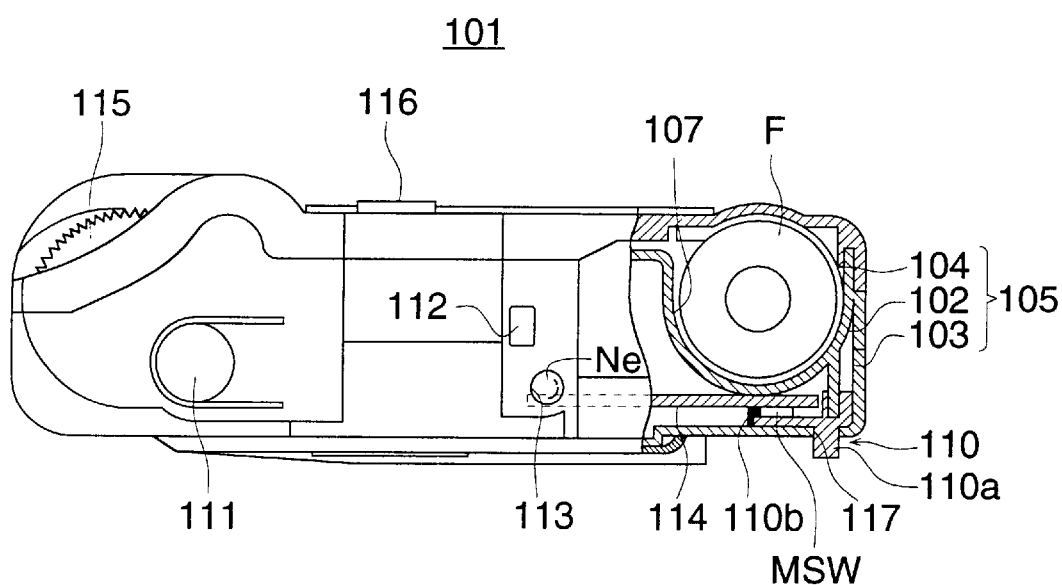
FIG. 11 is a partially cutout plan view of the single use camera, and shows the first example of Structure (5).
Figure 12:
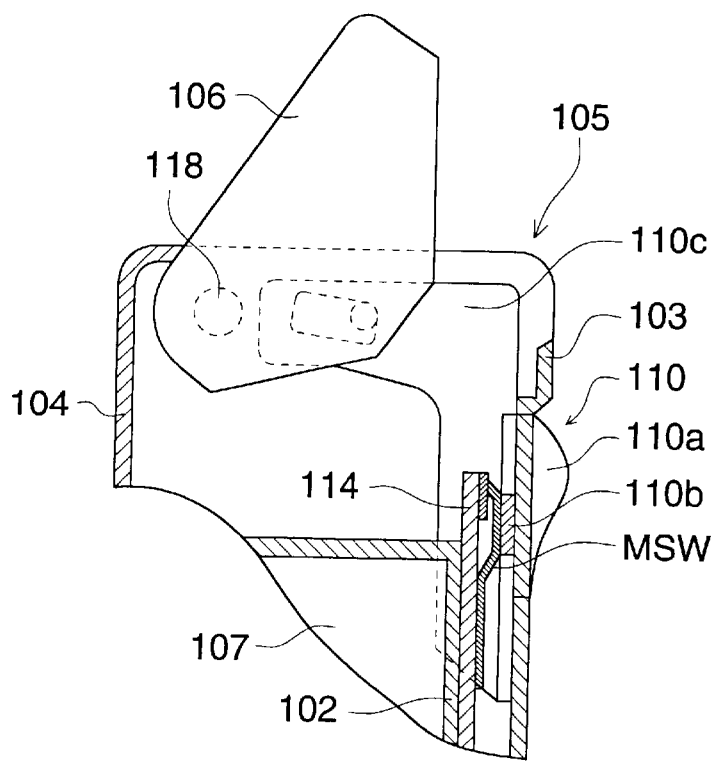
FIG. 12 is a sectional view taken on line VI—VI in FIG. 10 showing the first example of Structure (5).
Figure 13:
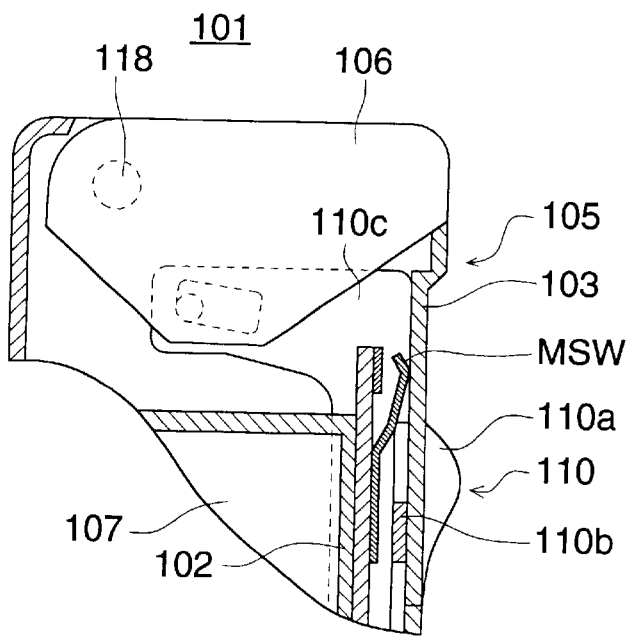
FIG. 13 is a sectional view in the same cutting position as in FIG. 12, in which a flash light emitting section is accommodated in the camera main body, and shows the first example of Structure (5).
Figure 14:
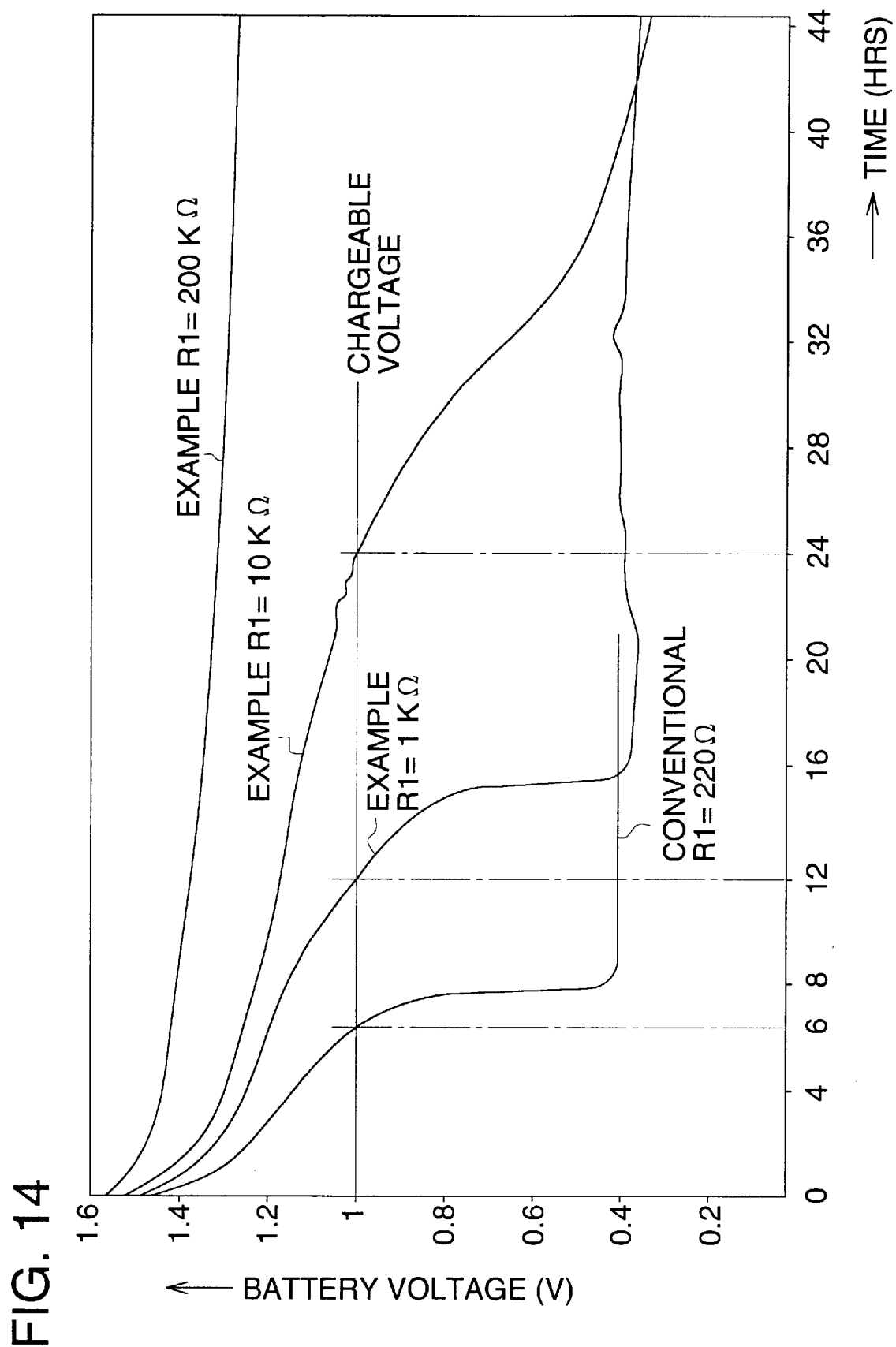
FIG. 14 is a graph showing a test result.

FIGS. 7 through 14 show the first example of the Structure (5) of the present invention. FIG. 7 is a flash circuit diagram for use in the single use camera. FIG. 8 is a perspective view of the single use camera viewed from the direction of the front. FIG. 9 is a perspective view of the single use camera viewed from the direction of the back. FIG. 10 is a partially cutout front view of the single use camera. FIG. 11 is a partially cutout plan view of the single use camera. FIG. 12 is a sectional view taken on line VI—VI in FIG. 10. FIG. 13 is a sectional view at the same cutting position as FIG. 12, and shows a state in which the flash light emitting section is accommodated in the camera main body. FIG. 14 is a graph showing a test result conducted based on the first example.

Figure 15:
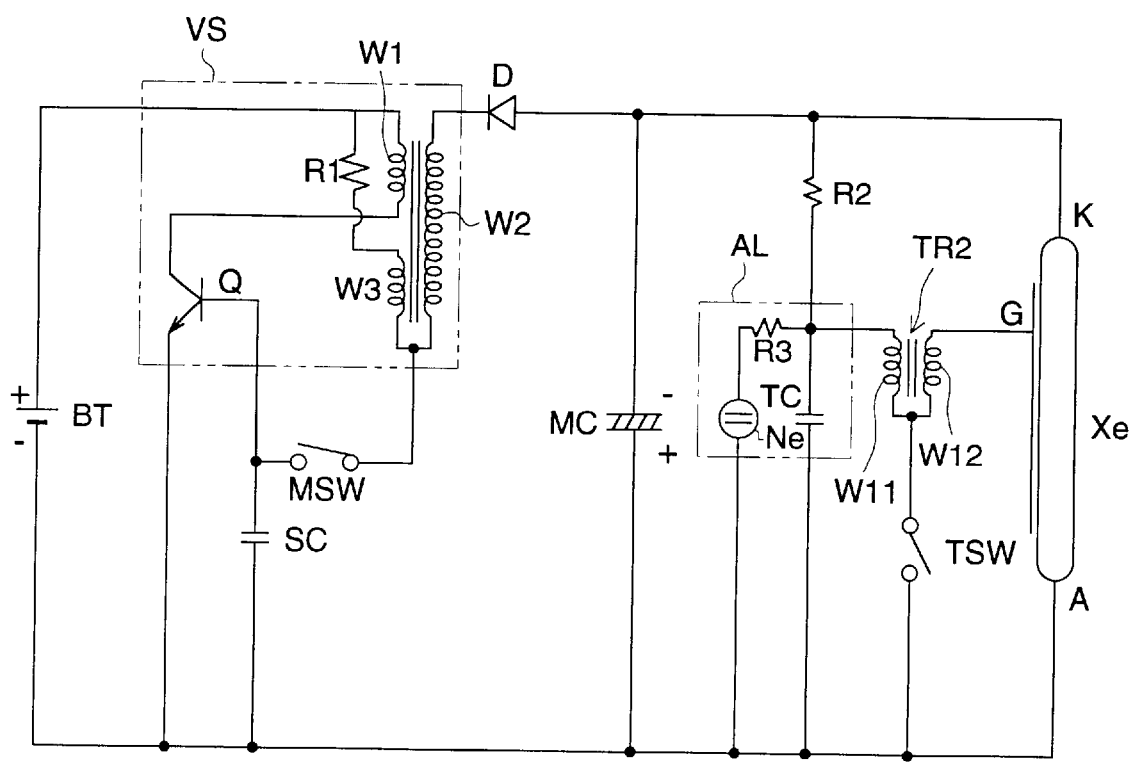
FIG. 15 is a flash circuit diagram of the single use camera, and shows a second example of Structure (5) of the present invention.
Figure 16:
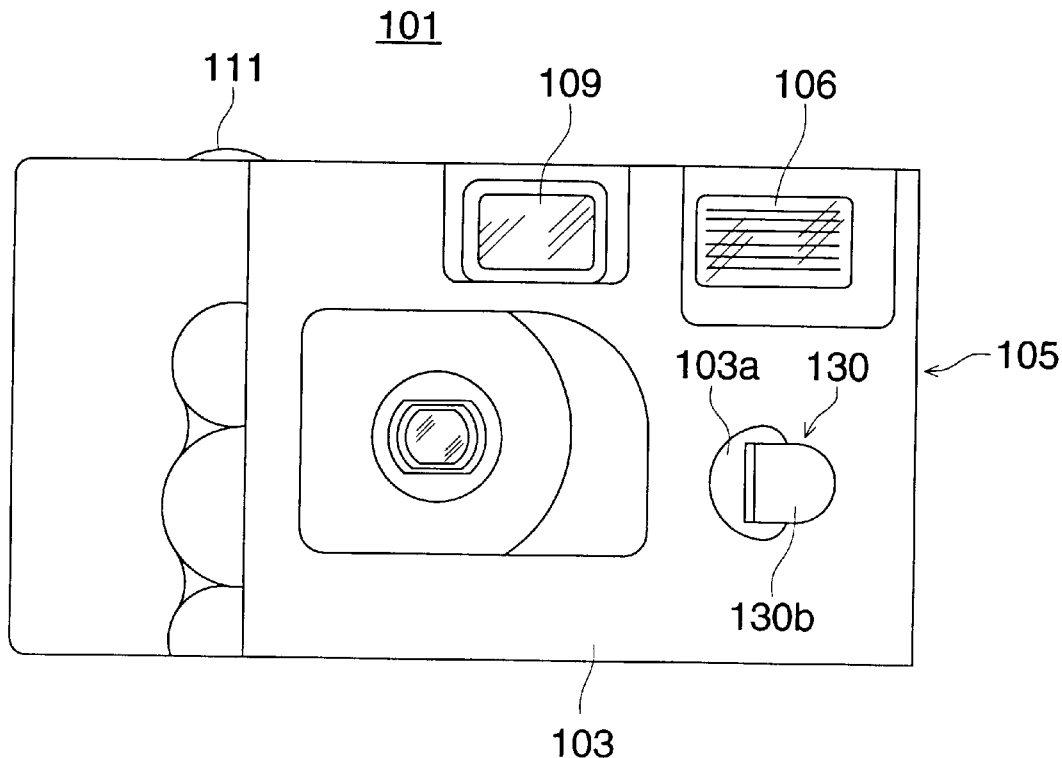
FIG. 16 is a front view of the single use camera, showing the second example of Structure (5).
Figure 17:
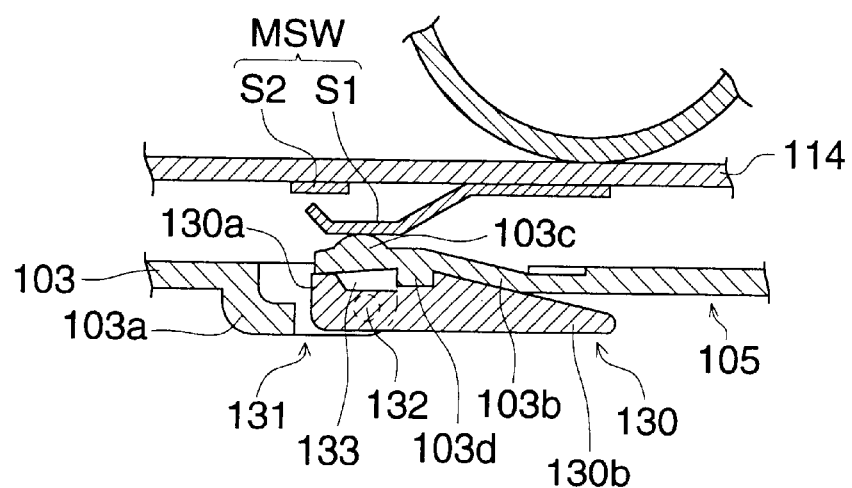
FIG. 17 is a plan view of a section of a main portion when a flash switch actuator is located at OFF position, and shows the second example of Structure (5).
Figure 18:
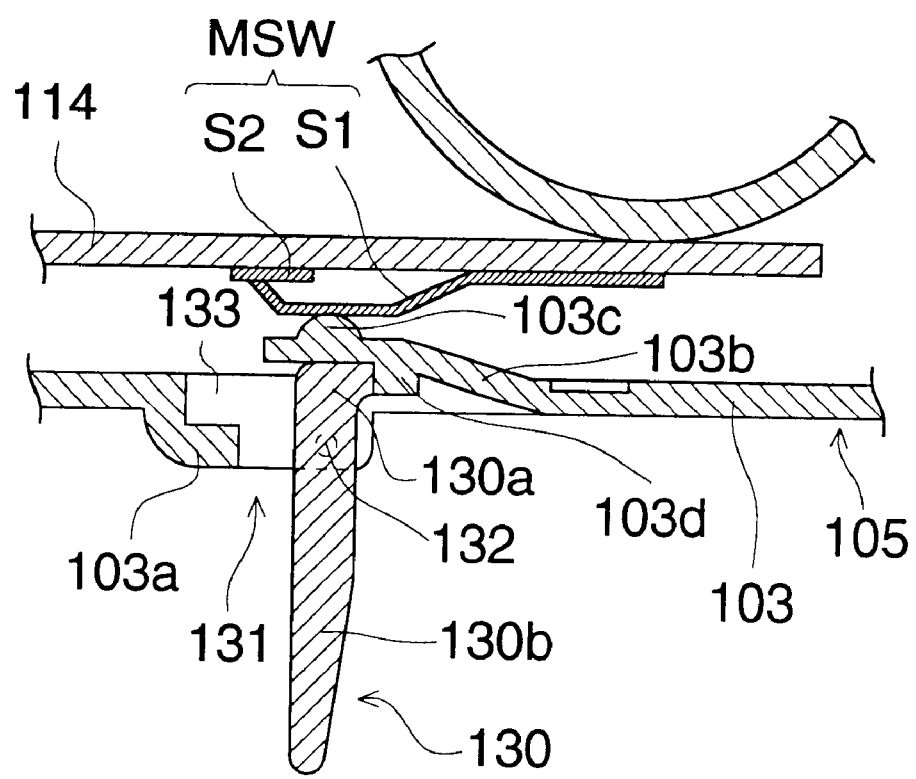
FIG. 18 is a plan view of a section of the main portion when the flash switch actuator is located at ON position, and shows the second example of Structure (5).

FIGS. 15 through 18 show the second example of the Structure (5) of the present invention. FIG. 15 is a flash circuit diagram for use in the single use camera. FIG. 16 is a front view of the single use camera using the flash circuit diagram in FIG. 15. FIGS. 17 and 18 gare sectional plan views in each of which a state holding type flash switch actuator to actuate the main switch in the flash circuit diagram in FIG. 15 is at OFF position and ON position.

In this connection, in the second example, the same structural elements as in the first example are denoted by the same numeric codes, and detailed description will be omitted.

In the single use camera 101 of the first example shown in FIGS. 7 through 14, a camera main body 105 is structured by a main body frame 102, having main components and main parts, and a front cover 103 and a rear cover 104, which are respectively provided on the front and the rear of the main body frame 102, and engaged with each other on the frame 102. A spring-up type flash light emitting section 106 is provided on the right end of the upper surface of the camera main body 102, and the camera main body 105 is a sealed type and can not be disassembled without exclusive disassembling tool.

In a film loading chamber 107 of the camera main body 105, the unexposed roll film F pulled out from a cartridge in a cartridge chamber (both of them are not shown) is wound up, and the film F is successively wound up in the cartridge for each exposed frame of the film, and when photographing has been entirely completed, all of the film F is accommodated in the cartridge.

On the camera main body 105, a picture taking lens 108, a viewfinder window 109, and a flash switch actuator 110 are provided on the front surface, and the flash light emitting section 106, a shutter release button 111, a film counter window 112 and a charging confirmation window 113 is provided on the upper surface. Inside the charging confirmation window 113, an indicator lamp Ne fitted on a flash substrate 114 in the camera main body 105 is provided, and by the flickering light emission of the indicator lamp Ne, the completion of the flash charging is notified. On the rear surface of the camera main body 105, a dial type film winding knob 115, and a view finder eye window 116 are provided, and a dry battery BT as a power source for a flash is housed in a battery chamber formed on the bottom surface side between the film loading chamber 107 and the cartridge chamber.

On the upper portion of the right end of the front surface of the camera main body, which is a lower portion of the flash light emitting section 106, a slit-like guide groove 117 is provided in the longitudinal direction, and the flash switch actuator 110 is arranged in the guide groove 117. The flash switch actuator 110 slides in the upward and downward direction in the guide groove 117, and it is a slide type and a state holding type operator which maintains an ON position at an upper end of the guide groove 117, and maintains an OFF position at the lower end thereof. The flash switch actuator 110 has a knob piece 110a arranged in the guide groove 117, a switch actuator piece 110b to open and close the main switch MSW which is fitted on the flash substrate 114, and a connecting piece 110c to spring up the flash light emitting section 106 or to make it housed in the camera main body 105. When the knob piece 110a is located at the ON position at the upper end of the guide groove 117, the flash light emitting section 106 at the upper portion is interlocked with the knob piece 110a, and sprung up from the upper surface of the camera main body 105 using a support shaft 118 as a fulcrum, and the flash circuit in the camera main body 105 is operated and charging for the flash is started. When the knob piece 110a is located at the OFF position at the lower end of the guide groove 117, the flash light emitting section 106 is interlocked with the knob piece 110a, and is lowered to the level of the upper surface of the camera main body, and the operation of the flash circuit is stopped and the charging for the flash is stopped.

The flash light emitting tube Xe is built in the flash light emitting section 106. Lighting of the flash light emitting tube Xe and flickering light emission of the indicator lamp Ne are conducted by the flash circuit equipped in the camera main body 105. In the flash circuit shown in FIG. 7, the dry battery BT is connected to a step-up circuit VS through one switch contact SW1 (power source switch) of a double-pole single-throw type normal open type main switch MSW which is opened and closed by the flash switch actuator 110.

The step-up circuit VS is composed of the oscillating transistor Q, the oscillating transformer TR1 having the primary winding W1, the secondary winding W2, and the tertiary winding W3, which is a feedback winding, and the resistor R1, and is oscillating-operated by the DC current supplied from the power source BT, and converts the DC current to the AC high voltage. The resistor R1 in the step-up circuit VS controls the current flowing through the step-up circuit VS. In the present example in which the oscillating transformer TR1 has the tertiary winding W3, the resistor R1 is set to the range of 1 KΩ–200 KΩ.

The step-up circuit VS is connected to the main capacitor (electrolytic capacitor) through the diode D, and the AC current supplied from the step-up circuit is rectified by the diode D and charges the main capacitor MC. The cathode (−) and anode (+) of the main capacitor are respectively connected to the cathode K and anode A of the flash light emitting tube (xenon tube) Xe, and supplies the discharging current to the flash light emitting tube Xe.

The lighting circuit is connected to a grid G of the flash light emitting tube Xe. The lighting circuit is composed of a resistor R2, a trigger capacitor TC, a trigger switch TSW, and a trigger transformer TR2 having the primary winding W11 and the secondary winding W12. The grid G of the flash light emitting tube Xe, the cathode (−) and anode (+) of the main capacitor MC are connected by the resistor R2 trigger switch TSW, and trigger transformer TR2.

In this lighting circuit, when the trigger switch TSW is closed interlocking with the shutter operation of the camera main body side, electric charges accumulated in the trigger capacitor TC flows through the primary winding W11 of the trigger transformer TR2 as the instantaneous current, and the pulse-like voltage generated in the secondary winding W12 by the instantaneous current is supplied to the grid G of the flash light emitting tube Xe, then, the flash light emitting tube Xe emits light.

An alarm circuit AL is connected to the above lighting circuit, and displays completion of the charging to the main capacitor MC, and alarms the forgotten interruption of the flash switch actuator 110. The alarm circuit AL is provided between the common connecting point of the resistor R2 and the trigger switch TSW, and the other switch contact point SW2 of the main switch MSW, and has a serial circuit of a resistor R3 and an indicator lamp Ne, and a trigger capacitor TC which is connected in parallel with the serial circuit and is used also for the lighting circuit. When the main switch MSW is closed, the alarm circuit AL is connected to both ends of the main capacitor MC through the resistor R2, and the indicator lamp Ne emits light in a flickering condition, and displays the completion of flash charging and gives the alarm.

Next, the operation of the flash circuit of the present example thus structured will be described.

Initially, when the flash switch actuator 110 is slid to the ON position at the upper end of the guide groove 117, the flash light emitting section 106 is sprung up from the upper surface of the camera main body 105, and simultaneously with that, the main switch MSW is closed, and the step-up circuit VS is connected to the power source BT through one switch contact point SW1 of the main switch MSW. By this operation, the oscillating transistor Q is operated, and the current flows through the primary winding W1 of the oscillating transformer TR1, and further, the high voltage current flows through the secondary winding W2. The high voltage AC current in the secondary winding W2 is rectified by the diode D and charges the main capacitor MC.

Further, the alarm circuit AL is connected to the positive electrode (+) of the main capacitor MC through the other switch contact point SW2 of the main switch MSW, and the same voltage across the negative electrode (−) and the positive electrode (+) of the main capacitor MC is applied to the resistor R2 and both ends of the alarm circuit AL, thereby, charging to the trigger capacitor TC of the alarm circuit AL is started. Then, the charging voltage of the trigger capacitor TC is applied onto the serial circuit, composed of the resistor R3 and the indicator lamp Ne, and when the charging voltage of the trigger capacitor TC reaches a predetermined value, discharging of the indicator lamp Ne is started, that is, the indicator lamp Ne is lit. At this time, the charging voltage of the main capacitor MC is at a predetermined value required for the flash light emitting.

The charging voltage of the trigger capacitor TC is lowered by lighting of the indicator lamp Ne, and when it is lowered to some extent, the indicator lamp Ne stops discharging and puts out lights. By this operation, the trigger capacitor TC is charged again, and when the charging voltage is increased, the indicator lamp Ne discharges again and is lit. The indicator lamp Ne thus repeats lighting and lights-out, and displays the charging completion of the main capacitor MC by flickering light emission.

After the indicator lamp Ne emits light in a flickering condition, when the shutter is operated by pressing the shutter release button 110, the trigger switch TSW is closed, and electric charges in the main capacitor MC is discharged through the primary winding W11 of the trigger transformer TR2 and high voltage is generated in the secondary winding W12 of the trigger transformer TR2, thereby, the flash light emitting tube Xe is lit, and the stroboscopic photographing is carried out. After the stroboscopic photographing is completed, the flash switch actuator 110 is moved to the OFF position, and the flash light emitting section 106 is lowered to the level of the upper surface of the camera main body, and simultaneously, by opening the main switch MSW, operations of the entire flash circuit including the alarm circuit are stopped, thereby, flickering of the indicator lamp also stops.

Next, a battery life test conducted on the single use camera 1 of the present example, will be described. In the step-up circuit VS of the flash circuit, the resistor R1 is set to a value of 1 KΩ to 200 KΩ as described above. One AA type alkaline dry battery of 1.5 V is combined with the resistor R1 as the power source for the flash, the flash switch actuator 110 is held at the ON position, and experiments to continue the flash charging is made. Then, the following results are obtained: the dry battery voltage more than 1 V which can charge the flash, (for example, which is necessary for stroboscopic photographing all frames of one roll film having 36 to 40 exposures), continues for about 12 hours at 1 KΩ of the minimum value of the resistor R1, about 24 hours at 10 KΩ, and more than 50 hours at 200 KΩ of the maximum value.

That is, when the minimum value of the resistor R1 of the step-up circuit Vs is 1 KΩ, as the minimum period of time during which the stroboscopic photographing can be carried out, 12 hours can be secured, which corresponds to 2 times of that at the conventional resistance value of 220 Ω. Thereby, even if the photographer forgets to turn off the flash switch actuator 110 and notices it the next day after one night passes, the stroboscopic photographing can be done sufficiently. Further, when the resistor R1 is not smaller than 200 KΩ, the oscillating operations becomes unstable, like that the oscillation of the oscillating transformer TR1 in the step-up circuit VS comes to hardly start, or the oscillation is stopped during its operation, therefore, it is preferable that the maximum value of the resistor R1 is 200 KΩ.

As described above, in the single use camera 101, during the flash operating state in which the state holding type flash switch actuator 110 is turned ON, the flash light emitting section 106 is sprung up from the upper surface of the camera main body 105, therefore, the appearance of the camera is changed from that in the non-stroboscopic photographing, and thereby, it is noticed to the photographer that the single use camera 1 is in the flash charging state. On the other hand, when the resistor R1 in the step-up circuit Vs is set to the minimum value of 1 KΩ to the maximum value of 200 KΩ, the wasteful consumption of the dry battery BT can be extremely suppressed. Therefore, even if the photographer forgets to turn OFF the flash switch actuator 110 and the flash charging is continued, as a period of time during which the stroboscopic photographing can be done, at least 12 hours can be secured even when the resistor R1 is the minimum value of 1 KΩ, and therefore, the camera-side can wait for the photographer to notice that he has forgotten to turn OFF the flash switch actuator 110. Further, when the resistor R1 is the maximum value of 200 KΩ, a period of time, during which stroboscopic photographing can be done, can be maintained for more than 50 hours, that is, during 2 to 3 days.

Further, in the present example, by only using the resister R1 of the minimum value of 1 KΩ to the maximum value of 200 KΩ in the step-up circuit, it is not necessary that the flash circuit and the shape of camera main body are changed, and thereby, large effects can be obtained in the aspects of economical efficiency and productivity. In this connection, as the power source BT for the flash, an AAA type or a smaller dry battery can be used other than an AA type alkaline dry battery having 1.5 V.

The present invention can also be applied to the second example shown in FIGS. 15 through 18. The flash circuit diagram in FIG. 15 is common to the first example in the point that the oscillating transformer TR1 having primary to tertiary winding is used in the step-up circuit, and the resistor R1 in the step-up circuit is set to the resistance value of 1 KΩ to 200 KΩ, and other than this, the third capacitor SC, which is not used in the flash circuit diagram (FIG. 7) of the first example, is added to the flash circuit diagram in FIG. 15. The second example is different from the first example in the following points: in the flash circuit diagram in FIG. 15, the main switch MSW is a single-pole single-throw type normal open type switch; the flash light emitting section 106 is a fixed type one as shown in FIG. 16;

and a stand-up type actuator is adopted as the flash switch actuator 130 shown in FIGS. 16 through 18, which is combined with the main switch MSW.

The main switch MSW is structured by the combination of a long contact point S1 and a short contact point S2 which are fitted to the side surface of the front portion of the camera main body of the flash substrate 114 provided in the camera main body 105. The flash switch actuator 130 is rotatably attached using a support shaft 132, onto an actuator attaching portion 131 formed on the front position of the main switch MSW on the front cover 103, in the vicinity of the base end of the actuator 130.

The flash switch actuator 130 is a plate-like body having an L letter shape operation piece 130a provided on the base end side from the support shaft 132, and a knob piece 130b on the leading edge side from the support shaft 132, and is rotated around the support shaft 132 within the range of 90° from the OFF position in parallel to the front cover 103 to the ON position in the direction of the front of the camera main body, which is perpendicular to the front cover 103.

The actuator attaching portion 131 is structured by a guide wall 103a which protrudes from the front cover 103 to the direction of the front of the camera main body 105 and encloses the operation piece 130a of the flash switch actuator 130; an operating force transmission piece 103b which protrudes from the front cover 103 in between the main switch MSW and the flash switch actuator 130; and an attaching concave portion 133 which is set between the guide wall 103a and the operating force transmission piece 103b.

A pressing movement portion 103C protruding to the direction of the main switch MSW and a stopper piece 103d protruding to the direction of the flash switch actuator are provided on the leading edge side of the operating force transmission piece 103b, and the elastic force in the direction of the front and back of the camera main body is provided on the operating force transmission piece 103b itself, and the operation piece 130a of the flash switch actuator 130 and the support shaft 132 are located in the attaching concave portion 133.

The long contact point S1 of the main switch MSW is separated from the short contact point S2 during the non-stroboscopic photographing in which the flash switch actuator 130 is located at the OFF position in parallel to the front surface of the front cover 103 (FIG. 17). When the knob piece 130b of the flash switch actuator 130 is held and the flash switch actuator 130 is rotated around the support shaft 132 in the direction of the front of the camera main body 105, the operating force transmission piece 103b is pushed by the operation piece 130a and is bent in the direction of the main switch MSW.

In the ON position at which the operation piece 130a comes into contact with the stopper piece 103d of the operating force transmission piece 103b and rotation of the flash switch actuator 130 is restricted, and the flash switch actuator 130 is stood up in the front direction of the camera main body, the long contact point S1 of the main switch MSW comes into contact with the short contact point S2 pressed by a pressing movement portion 103C of the operation force transmission piece 103b, and the flash circuit is closed and charging to the main capacitor MC is started (FIG. 18).

In the state in which the flash switch actuator 130 stands up in the front direction of the camera main body, the counter force from the long contact point S1 of the main switch MSW and the operation force transmission piece 103b exerts on the flash switch actuator 130 in the front direction of the camera main body, and the flash switch actuator 130 is turned ON and consumption of the dry battery continues.

However, in also the present example, the resistor R1 in the step-up circuit VS in the flash circuit diagram is set to the value of 1 KΩ to 200 KΩ, thereby, the life of the battery can be extremely extended, and in the same manner as in the first example, the stroboscopic photographing can be conducted for a long period of time.

The single use camera of the present invention is structured as described above, thereby, wasteful consumption of the dry battery is extremely suppressed, and even if the operator forgets to turn off the flash switch actuator, then, the flash charging is continued, and it is noticed after a long period of time, the stroboscopic photographing can be adequately conducted. Further, in the present invention, the resistor value of the step-up circuit may only be changed, and the flash circuit may be the same as the conventional one, therefore, the present invention is greatly excellent in the aspect of the economic efficiency and productivity.

Figure 19:
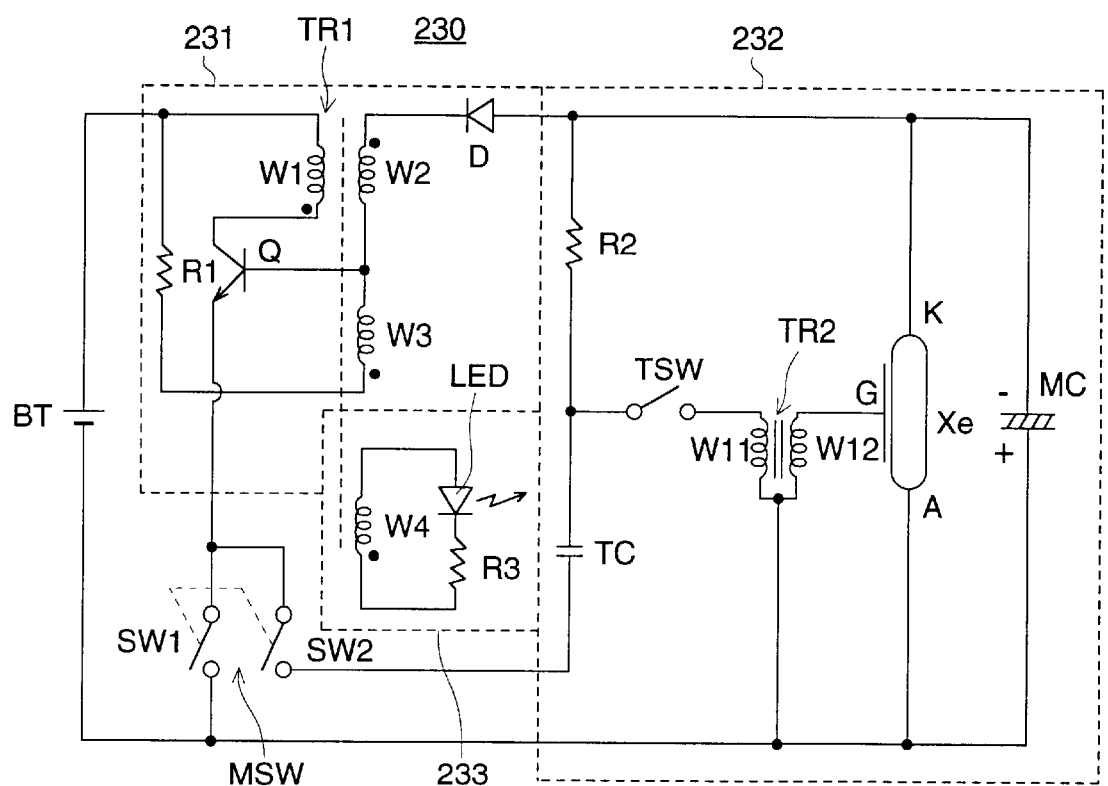
FIG. 19 is a flash circuit diagram for use in the single use camera, and shows the first example of Structure (6) of the present invention.
Figure 20:
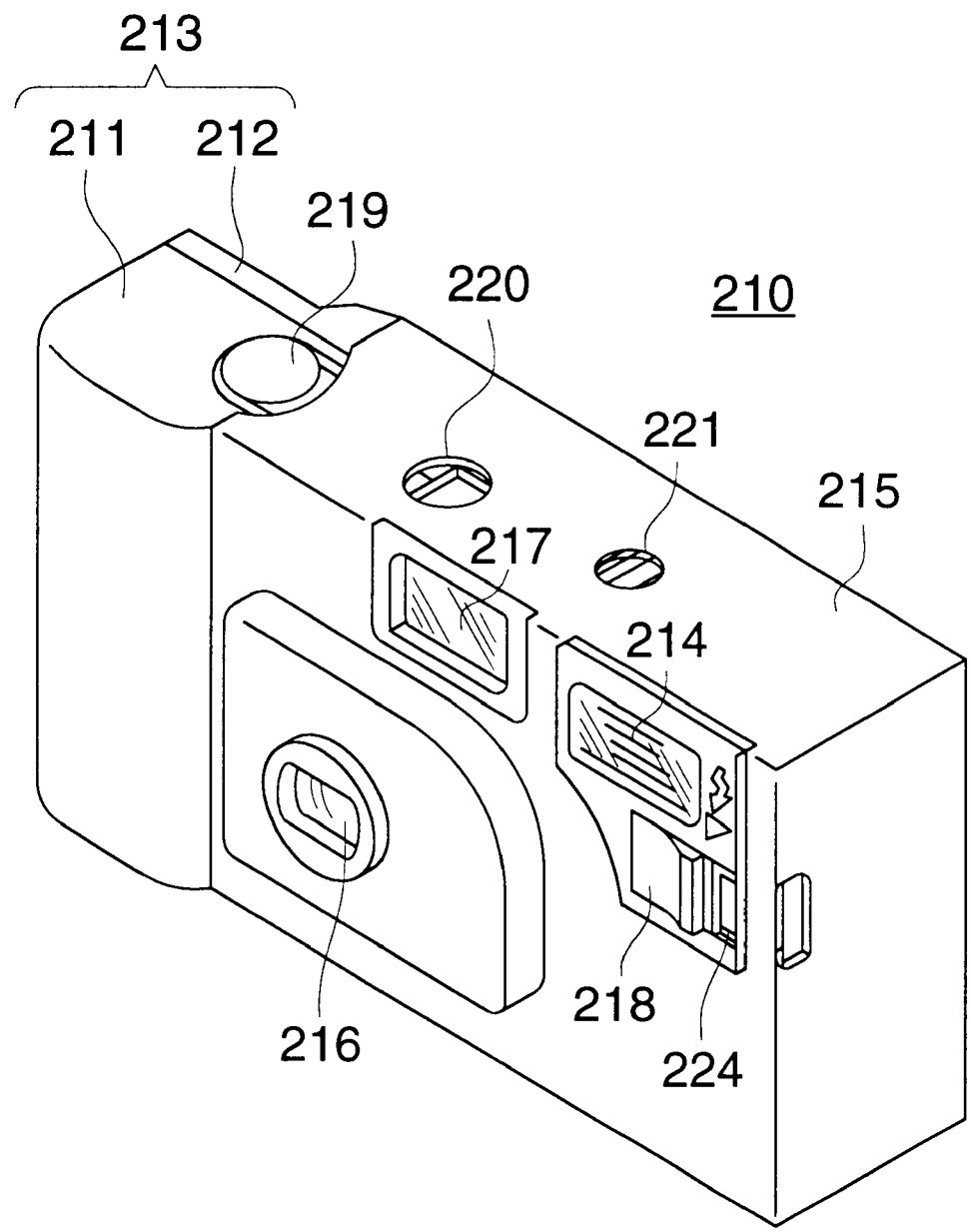
FIG. 20 is a perspective view of the single use camera viewed from the direction of the front, and shows the first example of Structure (6).
Figure 21:
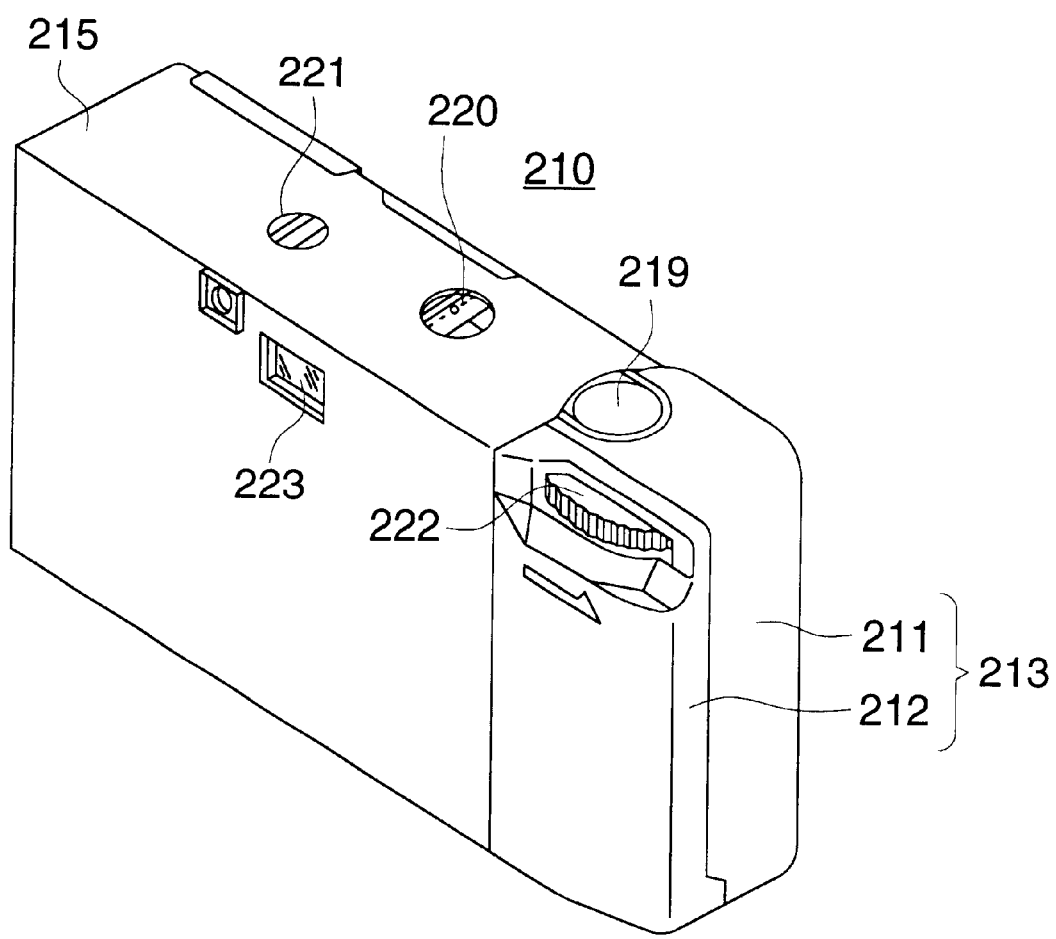
FIG. 21 is a perspective view of the single use camera viewed from the direction of the back, and shows the first example of Structure (6).

In the drawings, FIGS. 19 through 21 show the first example of the Structure (6) of the present invention. FIG. 19 is a flash circuit diagram for use in the single use camera. FIG. 20 is a perspective view of the single use camera viewed from the direction of the front. FIG. 21 is a perspective view of the single use camera viewed from the direction of the back.

Figure 22:
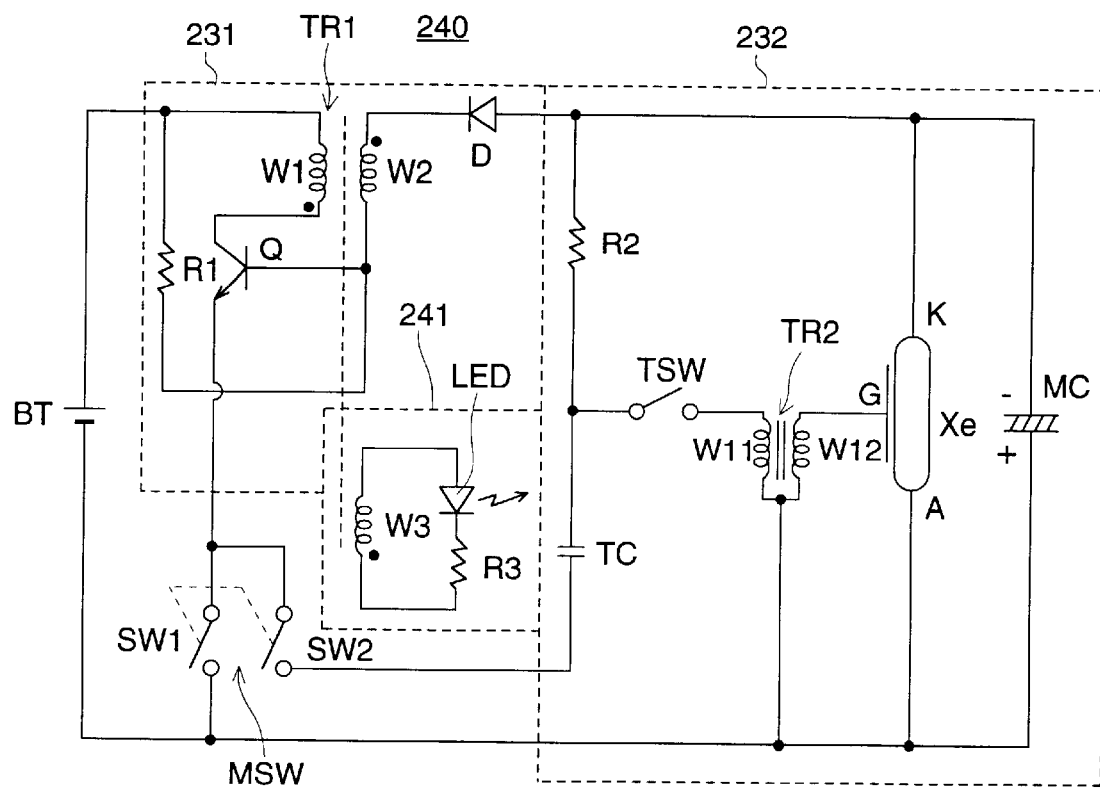
FIG. 22 is a flash circuit diagram showing the second example of Structure (6) of the present invention.
Figure 23:
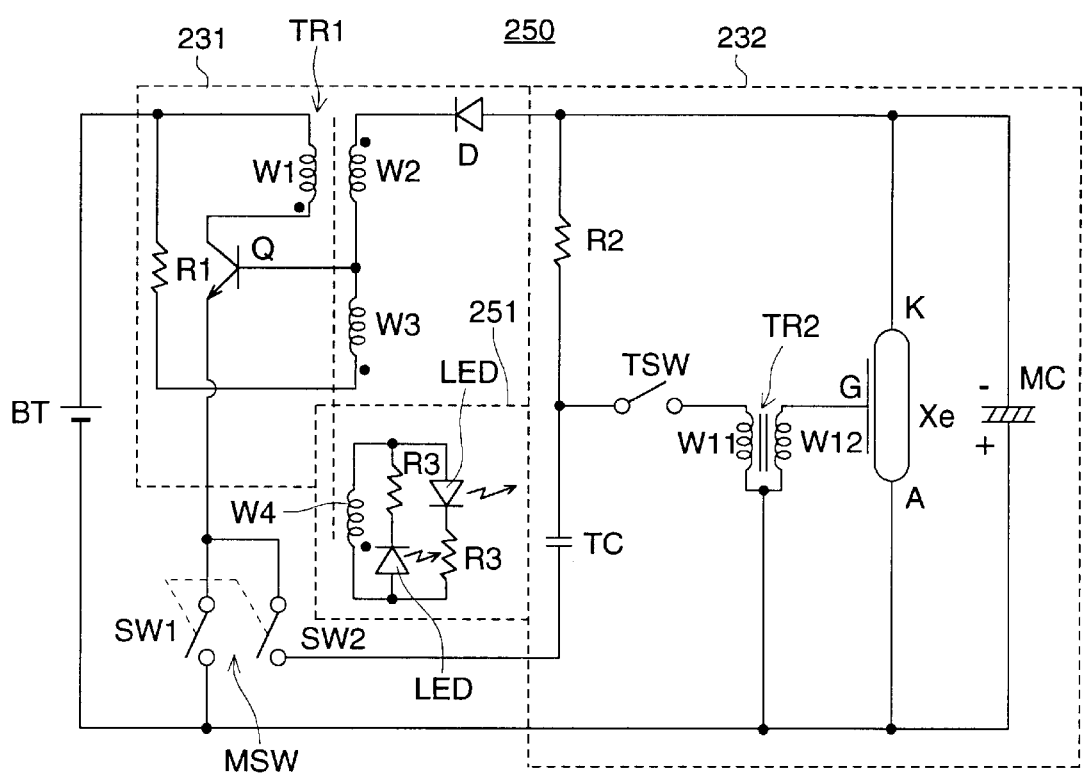
FIG. 23 is a flash circuit diagram showing the third example of Structure (6) of the present invention.
Figure 24:
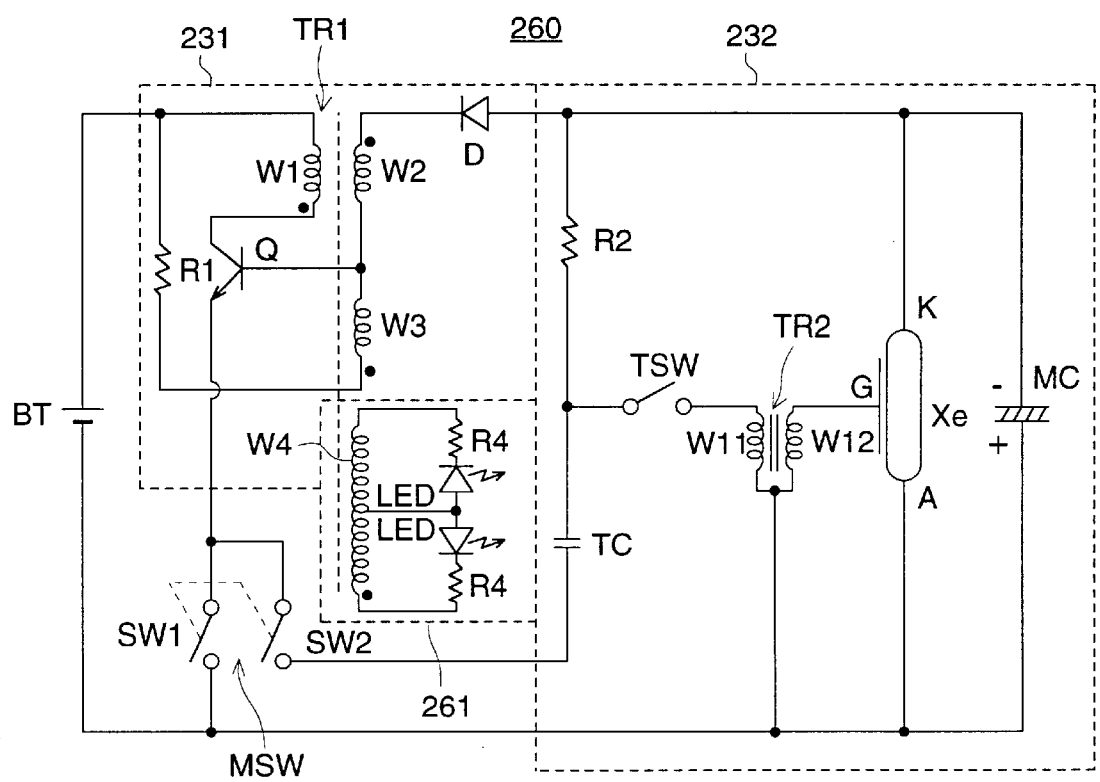
FIG. 24 is a flash circuit diagram showing the fourth example of Structure (6) of the present invention.
Figure 25:
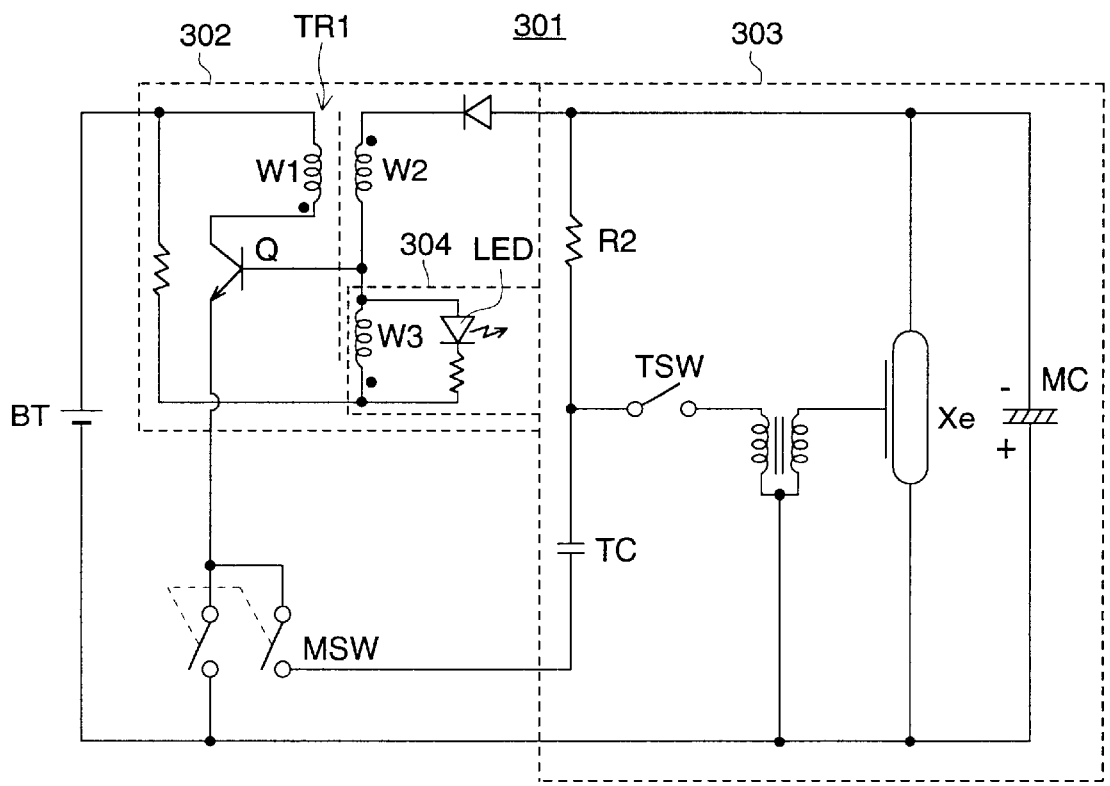
FIG. 25 is the conventional flash circuit diagram.

FIGS. 22 through 24 are flash circuit diagrams respectively showing the second, third, and fourth examples of the Structure (6) of the present invention. In this connection, in the first to fourth examples, the same structural elements as in FIG. 25 used for description of the conventional technology are denoted by the same numeric codes, and detailed description will be omitted.

In the single use camera 210 of the first example shown in FIGS. 19 to 21 the front and rear portions of the main body casing, not shown, having main components, are covered by a plastic front cover 211 and a rear cover 212, and the camera main body 213 is structured. A fixed type flash light emitting section 214 is provided on the right end of the upper surface of the camera main body 213. The unexposed roll film is previously loaded in the camera main body 213, whose main portion is covered by a paper cover 215, and there is no rear lid for film loading and unloading on the rear cover 212. The camera main body has the sealed structure whose front cover 211 and the rear cover 212 can not be separated from each other without a tool for disassembling.

On the camera main body 213, the flash light emitting section 214, a picture taking lens 216, a viewfinder window 217, and a flash switch actuator 218 are provided on the front surface, and a shutter release button 219, a film counter window 220 and a charging confirmation window 221 is provided on the upper surface. On the rear surface of the camera main body 213, a dial type film winding knob 222, and a view finder eye window 223 are provided, and a power source BT for a flash, such as a dry battery, is housed in a battery chamber formed in the bottom portion in the camera main body 213.

The flash switch actuator 218 is a slide type, which slides horizontally in the guide groove 224 provided under the flash light emitting section 214. At a position at which the outer end of the flash switch actuator 218 protrudes from one side portion of the camera main body 213, the main switch MSW provided in the flash circuit 230 in the camera main body 213 is turned ON and flash charging is started. At a position at which the inner end of the flash switch actuator 218 comes into contact with the inside wall of the guide groove 224, the main switch MSW is turned OFF and flash charging is stopped. Inside the charging confirmation window 221, the light emitting diode LED is provided in the flash circuit 230 in the camera main body 213 as the indicator lamp, and the completion of the flash charging is noticed by the lighting of the light emitting diode LED.

The flash light emitting tube (xenon tube) Xe is built in the flash light emitting section 214. Lighting of the flash light emitting tube Xe and light emission of the light emitting diode LED are conducted by the flash circuit 230 equipped in the camera main body 213. The flash circuit 230 shown in FIG. 19 has a step-up circuit 231 to step up the power source voltage to the voltage necessary for light emission of the flash light emitting tube Xe; a flash light emitting circuit 232 by which the high voltage from the step-up circuit 231 charges the main capacitor MC and the flash light emitting tube Xe emits light; and an LED lighting circuit 233 which makes the light emitting diode LED emit light, displays the completion of charging to the main capacitor MC, and notices that turning OFF of the flash switch actuator 218 is forgotten. The power source BT is connected to the step-up circuit 231 through one switch contact SW1 (power source switch) of a double-pole single-throw type normal-open type main switch MSW which is opened and closed by the ON/OFF operation of the flash switch actuator 218.

The step-up circuit 231 is composed of the oscillating transistor Q, the oscillating transformer TR1 and the resistor R1. The oscillating transformer TR1 has the primary winding W1, the secondary winding W2, and the tertiary winding W3, for flash light emission, and the quartic winding W4 for LED lighting. The oscillating transistor Q and the oscillating transformer TR1 constitute a free-running blocking oscillator, and when the main switch MSW is turned ON, the oscillating operation is conducted by the DC current supplied from the power source BT. The AC high voltage is generated in the secondary winding W2 corresponding to a winding ratio of the primary winding W1 and the secondary winding W2 of the oscillating transformer TR1, by an increase and decrease of the primary current flowing through the primary winding of the oscillating transformer TR1. The oscillating transformer TR1 is connected to the main capacitor (electrolytic capacitor) MC of the flash light emitting circuit 232 and trigger capacitor TC through the diode D, and the high voltage in the secondary winding W2 is rectified by the diode D, and charges the main capacitor MC and the trigger capacitor TC.

The flash light emitting circuit 232 is composed of the main capacitor MC, the flash light emitting tube Xe in the flash light emitting section 214, the trigger switch TSW which is opened and closed being interlocked with the shutter blade, the trigger transformer TR2 having the primary winding W11 and the secondary winding W12, the resistor R2 and the trigger capacitor TC. The cathode K and anode A of the flash light emitting tube Xe are respectively connected to the negative electrode (−) and the positive electrode (+) of the main capacitor MC, and the grid G is connected to the negative electrode (−) and the positive electrode (+) of the main capacitor MC, through the resistor R2, the trigger switch TSW and the trigger transformer TR2.

In this flash light emitting circuit 232, when the trigger switch TSW is closed interlocking with the shutter operation of the camera main body side, electric charges accumulated in the trigger capacitor TC flow through the primary winding W11 of the trigger transformer TR2 as the instantaneous current, and the pulse-like voltage generated in the secondary winding W12 by the instantaneous current is supplied to the grid G of the flash light emitting tube Xe, thereby, the current according to the voltage of the main capacitor MC flows through the flash light emitting tube Xe, then, the flash light emitting tube Xe emits light.

The LED lighting circuit 233 is composed of the light emitting diode LED and the resistor R3, and the quartic winding W4 which is incorporated in the oscillating transformer TR1 together with the primary winding W1 to tertiary winding W3 for flash light emitting. The resistor R3 is connected serially to the light emitting diode LED, and controls the value of the current flowing through the light emitting diode LED. The quartic winding W4 is a coil for exclusive use only for lighting of the light emitting diode LED, separated from the primary winding W1 to tertiary winding W3 for flash light emitting, and is arranged on the extended line of the secondary and tertiary windings W2 and W3. The light emitting diode LED side is connected to one end of the quartic winding W4 and the resistor R3 side is connected to the other end, and thus, the LED lighting circuit 233, which is a closed circuit independent of the step-up circuit 231, is structured.

The quartic current is generated in the quartic winding W4 separated from the primary winding W1 to tertiary winding W3, in the same manner as the secondary current in the secondary winding W2 and the tertiary current in the tertiary winding W3, and drives the LED lighting circuit 233. The light emitting amount and lighting timing of the light emitting diode LED in the LED lighting circuit 233, are determined by the number of windings of the quartic winding W4. Normally, the lighting timing is set in such a manner that the LED emits light at the stage in which the voltage of the main capacitor MC reaches a predetermined voltage value at which the LED can emits light.

The present example is structured as described above. In the flash circuit 230, the main switch MSW is closed when the flash switch actuator 218 is turned ON, and the step-up circuit 231 is connected to the power source BT through one switch contact point SW1 of the main switch MSW. By this operation, the oscillating transistor Q is operated, and the primary current flows through the primary winding W1 of the oscillating transformer TR1, and further, the AC high voltage is generated in the secondary winding W2. The high voltage AC current in the secondary winding W2 is rectified by the diode D and charges the main capacitor MC.

The power source BT is connected to the positive electrode (+) of the trigger capacitor TC through the other switch contact point SW2 of the main switch MSW, and the same voltage across the negative electrode (−) and the positive electrode (+) of the main capacitor MC is applied to the resistor R2 and both ends of the trigger capacitor TC, thereby, charging to the trigger capacitor TC is started. The primary current in the primary winding W1 generates the quartic current in the quartic winding W4 and drives the LED lighting circuit 233. One side of a peak voltage of the alternating current generated at the quartic winding W4 is increased as a charging voltage at the main capacitor MC is increased. The light emitting diode LED in the LED lighting circuit 233 is mounted so that the increasing peak voltage is applied as a normal direction voltage, and starts discharging, according to the number of windings of the quartic winding W4 when the voltage of the main capacitor MC and the trigger capacitor TC reaches the predetermined charging voltage, and notices the state that the flash can emit light, by lighting.

After the light emitting diode LED emits light, when the shutter is operated by pressing the shutter release button 219, the trigger switch TSW is closed by the shutter blade, and electric charges accumulated in the trigger capacitor TC flow through the primary winding W11 of the trigger transformer TR2 as the instantaneous current, and the pulse-like voltage generated in the secondary winding W12 by the instantaneous current is supplied to the grid G of the flash light emitting tube Xe, thereby, the current according to the voltage of the main capacitor MC flows through the flash light emitting tube Xe, then, the flash light emitting tube Xe emits light, and the stroboscopic photographing is carried out.

In the single use camera 210 of the present invention, the quartic winding W4 for exclusive use for the indicator lighting is separately added to the oscillating transformer TR1 having the primary winding W1 to the tertiary winding W3 for the flash lighting. The LED lighting circuit 233, in which the quartic winding W4 is separately provided from the primary winding W1 to the tertiary winding W3 and is combined with the light emitting diode LED, is separately structured from the step-up circuit 231. Thereby, the lighting function of the light emitting diode LED can be independently set without influencing on the charging characteristic of the step-up circuit 231. Accordingly, the light emitting amount or lighting timing of the light emitting diode LED can be freely set by increasing or decreasing the number of windings of the quartic winding W4 while the base potential voltage of the oscillating transistor Q is stabilized by using the tertiary winding W3.

FIG. 22 shows the second example of the present invention, and the oscillating transformer TR1 having the primary winding W1 and the secondary winding W2 is used in the step-up circuit 231 of the flash circuit 240 as the winding for the flash light emitting. The tertiary winding W3 for exclusive use for lighting of the light emitting diode is separately added to the oscillating transformer TR1 on the extended line of the secondary winding W2. The light emitting diode LED and the resistor R3 are connected to the tertiary winding W3 in the same manner as in the first example, and the LED lighting circuit 241 is structured independently from the step-up circuit 231.

In the present invention, in the same manner as the third example shown in FIG. 23 or the fourth example shown in FIG. 24, it is also possible to combine 2 light emitting diode LEDs as the indicator lamp. In the flash circuits 50 and 60 in the third and fourth examples, the quartic winding W4 for exclusive use for the lighting of the light emitting diode is separately provided from the secondary winding W2 and the tertiary winding W3.

In the flash circuit 250 shown in the third example in FIG. 23, 2 light emitting diodes LEDs to which resistors R3 are respectively connected in serial, are reversed to each other, and connected to both ends of the quartic winding W4 in parallel. Further, in the flash circuit 260 shown in the fourth example in FIG. 24, 2 light emitting diodes LEDs combined with the resistors R4 are serially connected to each other in the reverse direction, and their external end portions are connected to both ends of the quartic winding W4, and terminals are provided at the intermediate portion of 2 light emitting diodes and the intermediate portion of the quartic winding W4, and connected to each other. Thus, the LED lighting circuits 251 and 261 in which one quartic winding W4 is commonly used for 2 light emitting diodes LED, are independently formed from the step-up circuit 231.

In the LED lighting circuits 251 and 261, 2 light emitting diodes LEDs are reversely connected to each other, therefore, the behavior such as lighting amount or lighting timing, is respectively different from each other, and 2 light emitting diodes LEDs can be separately used for the in-charging display and for the charging completion display like a two-color light emitting diode. Further, one light emitting diode, which emits light at first, irradiates the human object, thereby, the pink-eye effect can be prevented. Further, in the LED lighting circuit 261 in the fourth example, the intermediate terminal is moved, and the number of windings of the quartic winding W4 may be changed for each light emitting diode, or each of the light emitting diodes LEDs may be provided with the quartic winding W4.

Incidentally, in the present invention, 2-color light emitting diodes may be used in the LED lighting circuit. In this case, for example, the in-charging and the charging completion can also be displayed by each color.

As described above, in the single use camera of the present invention, the light emitting diode lighting circuit is structured in such a manner that the winding for the light emitting diode is provided in the oscillating transformer in the step-up circuit, separately from the primary winding to the n-th order winding for the flash lighting, and the light emitting diode is connected to both ends of the winding for light emitting diode. Accordingly, the lighting function of the light emitting diode can be independently set without influencing on the charging characteristic of the step-up circuit. Thereby, when the number of windings of the winding for light emitting diode is increased or decreased, the lighting amount or lighting timing of the light emitting diode can be freely set.

Disclosed embodiment can be varied by a skilled person without departing from the spirit and scope of the invention.

What is claimed is:

1. A single use camera with a built-in electronic flash comprising:
   (a) a main body;
   (b) a photographic film loaded in the main body previously;
   (c) an electronic flash unit having an electronic flash light emitting section and an electronic flash circuit; and
   (d) a photographing unit having a photographic lens and a shutter,
   wherein the following condition is satisfied, $$6 \leq A \leq 9.5$$

wherein A represents an exposure value, which is determined by an aperture value, a shutter speed, and a sensitivity of said photographic film loaded in the single use camera, when photographed in a condition in which said electronic flash unit is used.

2. The single use camera of claim 1 wherein the aperture value or the shutter speed of the single use camera is changed so that, when said electronic flash unit is not used, the following condition is satisfied, $$A+1 \leq B \leq A+4$$

wherein B represents an exposure value, which is determined by the aperture value, the shutter speed and the sensitivity of said photographic film loaded in the single use camera, when photographed in a condition in which said electronic flash unit is not used.

3. The single use camera of claim 1, wherein the aperture value in the condition in which the electronic flash unit is used, is not less than F5.6.

4. The single use camera of claim 1, wherein the electronic flash circuit has a main capacitor, whose capacitance is not less than 15 mF and not more than 80 mF.

5. The single use camera of claim 4, wherein the photographic film has a sensitivity of ISO 640 or more.

6. The single use camera of claim 4 further comprising a power source for the electronic flash unit having an AAA type or an N type battery.

7. The single use camera of claim 4, wherein the electronic flash circuit comprises a circuit with a push-type main switch or with an automatic charge stopping circuit.

8. The single use camera of claim 1, wherein the electronic flash unit comprises a light emitting diode as an indicator lamp lighting or flickering when an electric charge to the electronic flash unit is completed, a turns ratio of a trigger transformer making a discharge tube in the electronic flash light emitting section to emit light, is not less than 20 and not more than 35.

9. The single use camera of claim 1,
   wherein the electronic flash unit comprises an electronic flash switch actuator for operating a main switch in the electronic flash circuit,
   wherein the electronic flash circuit has a step-up circuit having an oscillating transformer including a first, second, and third windings, and a resistor for controlling a current in the step-up circuit, and
   wherein the electronic flash switch actuator is a state holding type one, and the resistor is not less than 1 KW and not more than 200 KW.

10. The single use camera of claim 1, wherein the electronic flash circuit including;
   a main switch which is turned on or off by an electronic flash switch actuator, an oscillating transformer having a first, second and third windings for boosting a voltage of a power source to a higher voltage, a main capacitor connected with the oscillating transformer, to which the higher voltage boosted by the oscillating transformer is applied, an oscillating transistor for oscillating the oscillating transformer, a trigger capacitor connected with a terminal of the main capacitor through a resistor, and a trigger coil for applying a higher voltage to a discharge tube of the electronic flash light emitting section by circulating an electric charge accumulated in the trigger capacitor, wherein one terminal of the main switch is connected with a terminal between the second and third windings of the oscillating transformer and connected with a terminal of the trigger capacitor, the other terminal of the main switch is connected with a base of the oscillating transistor and an emitter of the oscillating transistor is electrically grounded.

11. The single use camera of claim 10, wherein the electronic flash circuit includes a trigger switch that is turned on according to an opening operation of a shutter blade, and wherein the other terminal of the trigger capacitor, the trigger switch and one terminal of a first winding of the trigger coil are connected in series, and the other terminal of the first winding of the trigger coil is grounded.

12. The single use camera of claim 10 further comprising a light emitting diode as an indicator lamp, the third winding of the oscillating transformer being connected with the light emitting diode in parallel.

13. The single use camera of claim 1, wherein the electronic flash circuit including;

a main switch turned on or off by an electronic flash switch actuator, an oscillating transformer having a first, second and third windings for boosting a voltage of the power source to a higher voltage, a main capacitor connected with the oscillating transformer to which the higher voltage boosted by the oscillating transformer is applied, an oscillating transistor for oscillating the oscillating transformer, a trigger capacitor connected with a terminal of the main capacitor through a resistor, and a trigger coil for applying a high voltage to a discharge tube of the electronic flash light emitting section by flowing an electric charge accumulated in the trigger capacitor, wherein one terminal of the main switch is connected with an emitter of the oscillating transistor, the other terminal of the main switch is electrically grounded, and a base of the oscillating transistor is connected with a terminal between the second and third windings of the oscillating transformer and connected with one terminal of the trigger capacitor.

14. The single use camera of claim 13, wherein the electronic flash circuit includes a trigger switch that is turned on according to an opening operation of a shutter blade, and wherein the other terminal of the trigger capacitor, the trigger switch and one terminal of a first winding of the trigger coil are connected in series, and the other terminal of the first winding of the trigger coil is grounded.

15. The single use camera of claim 13 further comprising a light emitting diode as an indicator lamp, the third winding of the oscillating transformer being connected with the light emitting diode in parallel.

16. The single use camera of claim 1, wherein the electronic flash unit includes a light emitting diode as a indicator lamp, wherein the electronic flash circuit includes an oscillating transformer for boosting a voltage of the power source to a high voltage, which has a first to n-th order windings for light emission of the electronic flash light emitting section, a winding for the light emitting diode which is different from the first to n-th order windings for light emission of the electronic flash light emitting section, the light emitting diode is connected with both terminal of the winding for the light emitting diode.

17. The single use camera of claim 1 wherein the following condition is satisfied, $$7 \leq A \leq 9.5$$

18. The single use camera of claim 1 wherein the following condition is satisfied, $$7 \leq A \leq 9.$$

19. The single use camera of claim 1 wherein the shutter speed T, when said electronic flash unit is used, satisfies the following condition, $$T \leq 1/50.$$

20. The single use camera of claim 2 wherein the following condition is satisfied, $$A+1 \leq B \leq A+3.$$

* * * * *